(12) United States Patent
Vandwalle et al.

(10) Patent No.: US 10,271,293 B2
(45) Date of Patent: Apr. 23, 2019

(54) GROUP FORMATION WITHIN A SYNCHRONIZED HIERARCHY OF PEER-TO-PEER DEVICES

(71) Applicant: Apple Inc., Cupertino, CA (US)

(72) Inventors: Pierre B. Vandwalle, Sunnyvale, CA (US); Christiaan A. Hartman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 282 days.

(21) Appl. No.: 13/736,725

(22) Filed: Jan. 8, 2013

(65) Prior Publication Data
US 2013/0185373 A1    Jul. 18, 2013

Related U.S. Application Data

(63) Continuation-in-part of application No. 13/625,752, filed on Sep. 24, 2012, now abandoned.
(Continued)

(51) Int. Cl.
*H04W 56/00* (2009.01)
*H04L 29/08* (2006.01)
*H04W 84/20* (2009.01)

(52) U.S. Cl.
CPC ....... *H04W 56/0015* (2013.01); *H04L 67/104* (2013.01); *H04W 84/20* (2013.01); *Y02D 70/10* (2018.01)

(58) Field of Classification Search
CPC ............... H04L 29/08072; H04L 29/06; H04L 29/08981; H04L 12/403; H04L 12/2803
(Continued)

(56) References Cited

U.S. PATENT DOCUMENTS 5,022,046 A   6/1991   Morrow, Jr.
5,247,650 A   9/1993   Judd et al.
(Continued)

FOREIGN PATENT DOCUMENTS

CN   101013926 A   8/2007
CN   101296249 A   10/2008
(Continued)

OTHER PUBLICATIONS

Lee et al., "IEEE 802.15.5 WPAN Mesh Standard-Low Rate Part: Meshing the Wireless Sensor Networks", 2010.
(Continued)

*Primary Examiner* — Douglas B Blair
*Assistant Examiner* — Christopher Cadorna
(74) *Attorney, Agent, or Firm* — Sterne, Kessler, Goldstein & Fox P.L.L.C.

(57) ABSTRACT

A system, apparatus and method for organizing devices in a peer-to-peer communication environment. A number of devices synchronize among themselves and select masters (or synchronization stations) to organize the devices into a hierarchy. Master devices have associated preference values reflecting their preference or suitability to be a master device, and broadcast synchronization frames to keep devices synchronized. When multiple devices in one or more hierarchies execute a common application or service, they form a private group to exchange or share data (e.g., play a game, transfer a file). All devices in the hierarchy maintain and advertise a public or default identifier of the hierarchy, and all devices in the private group maintain and advertise a private identifier specific to the group. Members of the group synchronize under a top group master (or root sync station), which synchronizes with a master that is part of the hierarchy.

21 Claims, 20 Drawing Sheets

Related U.S. Application Data

(60) Provisional application No. 61/586,664, filed on Jan. 13, 2012, provisional application No. 61/666,547, filed on Jun. 29, 2012, provisional application No. 61/708,471, filed on Oct. 1, 2012, provisional application No. 61/561,736, filed on Nov. 18, 2011.

(58) Field of Classification Search
USPC .......................................................... 709/208
See application file for complete search history.

(56) References Cited

U.S. PATENT DOCUMENTS

| | | | |
|---|---|---|---|
| 5,426,633 A | 6/1995 | Tanaka et al. | |
| 5,831,848 A | 11/1998 | Rielly et al. | |
| 6,031,863 A | 2/2000 | Jusa | |
| 6,134,234 A | 10/2000 | Kapanen | |
| 6,192,230 B1 | 2/2001 | van Bokhorst et al. | |
| 6,446,092 B1* | 9/2002 | Sutter | G06F 17/30578 |
| 6,721,315 B1 | 4/2004 | Xiong et al. | |
| 7,280,557 B1 | 10/2007 | Biswas et al. | |
| 7,468,969 B2 | 12/2008 | Zuniga | |
| 7,522,639 B1 | 4/2009 | Katz | |
| 7,535,907 B2 | 5/2009 | Hussain et al. | |
| 7,548,923 B2 | 6/2009 | Vasishth et al. | |
| 7,675,869 B1 | 3/2010 | Anker et al. | |
| 7,802,001 B1 | 9/2010 | Petry et al. | |
| 7,849,150 B2 | 12/2010 | Loeebbert et al. | |
| 7,920,881 B2 | 4/2011 | Fullam | |
| 7,941,564 B2 | 5/2011 | Gebhardt et al. | |
| 7,987,491 B2 | 7/2011 | Reisman | |
| 8,190,680 B2 | 5/2012 | Spilo et al. | |
| 8,239,479 B2 | 8/2012 | Sagar et al. | |
| 8,374,140 B2 | 2/2013 | Hu | |
| 8,570,898 B1 | 10/2013 | Kopikare et al. | |
| 8,699,406 B1 | 4/2014 | Charles et al. | |
| 8,798,019 B2 | 8/2014 | Saito et al. | |
| 9,473,574 B2 | 10/2016 | Vandwalle et al. | |
| 9,516,615 B2 | 12/2016 | Stacey et al. | |
| 2002/0053985 A1 | 5/2002 | Nesbitt | |
| 2002/0065919 A1 | 5/2002 | Taylor | |
| 2002/0103943 A1 | 8/2002 | Lo et al. | |
| 2002/0133631 A1 | 9/2002 | Yun | |
| 2002/0178292 A1 | 11/2002 | Mushkin et al. | |
| 2003/0169722 A1 | 9/2003 | Petrus et al. | |
| 2003/0172179 A1 | 9/2003 | del Prado Pavon et al. | |
| 2004/0010623 A1 | 1/2004 | Sher et al. | |
| 2004/0136392 A1 | 7/2004 | Diachina et al. | |
| 2004/0223466 A1 | 11/2004 | Schrader et al. | |
| 2004/0255001 A1 | 12/2004 | Oh et al. | |
| 2005/0079883 A1 | 4/2005 | Khawand | |
| 2005/0105524 A1 | 5/2005 | Stevens et al. | |
| 2006/0190521 A1 | 8/2006 | Kojima | |
| 2006/0190553 A1 | 8/2006 | Kojima | |
| 2006/0239333 A1 | 10/2006 | Albert et al. | |
| 2006/0245454 A1 | 11/2006 | Balasubramanian et al. | |
| 2006/0246947 A1 | 11/2006 | Fujii et al. | |
| 2006/0268744 A1 | 11/2006 | Sakai et al. | |
| 2006/0286975 A1 | 12/2006 | Sugitani et al. | |
| 2007/0050240 A1 | 3/2007 | Belani et al. | |
| 2007/0098116 A1 | 5/2007 | Kim et al. | |
| 2007/0160055 A1 | 7/2007 | Takahashi | |
| 2007/0198740 A1* | 8/2007 | Peters | H04N 21/235 709/245 |
| 2008/0040511 A1 | 2/2008 | Messer et al. | |
| 2008/0068217 A1 | 3/2008 | Van Wyk et al. | |
| 2008/0107218 A1 | 5/2008 | Geissler et al. | |
| 2008/0168185 A1 | 7/2008 | Robbin et al. | |
| 2008/0240072 A1 | 10/2008 | Bykovnikov | |
| 2008/0247336 A1 | 10/2008 | Sugitani | |
| 2009/0017851 A1 | 1/2009 | Li et al. | |
| 2009/0034432 A1 | 2/2009 | Boma et al. | |
| 2009/0083441 A1 | 3/2009 | Clark et al. | |
| 2009/0147806 A1 | 6/2009 | Brueckheimer | |
| 2009/0172201 A1 | 7/2009 | Carmel | |
| 2009/0217074 A1 | 8/2009 | Nichols et al. | |
| 2009/0228732 A1* | 9/2009 | Budde | H04B 7/269 713/400 |
| 2009/0248900 A1 | 10/2009 | Marucheck et al. | |
| 2009/0274137 A1 | 11/2009 | Hall et al. | |
| 2009/0282169 A1* | 11/2009 | Kumar | H04L 67/1095 709/248 |
| 2009/0290572 A1 | 11/2009 | Gonia et al. | |
| 2010/0014460 A1 | 1/2010 | Shin et al. | |
| 2010/0027526 A1 | 2/2010 | Bultan et al. | |
| 2010/0061493 A1 | 3/2010 | Takahashi et al. | |
| 2010/0097952 A1 | 4/2010 | McHenry et al. | |
| 2010/0106588 A1 | 4/2010 | Jones et al. | |
| 2010/0135334 A1 | 6/2010 | Briscoe et al. | |
| 2010/0173586 A1 | 7/2010 | McHenry et al. | |
| 2010/0182980 A1 | 7/2010 | Jobert et al. | |
| 2010/0272083 A1 | 10/2010 | Itoh et al. | |
| 2010/0303038 A1 | 12/2010 | Krohn et al. | |
| 2010/0305740 A1 | 12/2010 | Kent et al. | |
| 2010/0309021 A1 | 12/2010 | Picard | |
| 2011/0092245 A1 | 4/2011 | Noonan et al. | |
| 2011/0093599 A1* | 4/2011 | Baratz | H04L 29/12094 709/228 |
| 2011/0095965 A1 | 4/2011 | Yoneoka et al. | |
| 2011/0153773 A1 | 6/2011 | Vandwalle et al. | |
| 2011/0153818 A1 | 6/2011 | Vandwalle et al. | |
| 2011/0154084 A1 | 6/2011 | Vandwalle et al. | |
| 2011/0170527 A1 | 7/2011 | Yamamoto et al. | |
| 2011/0206032 A1 | 8/2011 | Uemura et al. | |
| 2011/0216757 A1 | 9/2011 | Michel | |
| 2011/0222515 A1* | 9/2011 | Wang | H04W 84/20 370/338 |
| 2011/0289176 A1 | 11/2011 | Toyama | |
| 2011/0292786 A1 | 12/2011 | Haessler et al. | |
| 2011/0310754 A1* | 12/2011 | Laursen | H04J 3/0641 370/252 |
| 2012/0106428 A1 | 5/2012 | Schlicht et al. | |
| 2012/0184311 A1 | 7/2012 | Yamamoto et al. | |
| 2012/0184312 A1 | 7/2012 | Yamamoto et al. | |
| 2013/0065620 A1* | 3/2013 | Jovicic | H04W 8/005 455/500 |
| 2013/0132500 A1 | 5/2013 | Vandwalle et al. | |
| 2013/0132501 A1 | 5/2013 | Vandwalle et al. | |
| 2013/0132502 A1 | 5/2013 | Stacey et al. | |
| 2013/0276152 A1* | 10/2013 | Hirsch | G06F 21/88 726/35 |
| 2013/0336340 A1 | 12/2013 | Ando | |
| 2014/0126610 A1* | 5/2014 | Hui | H04W 56/001 375/134 |
| 2014/0153444 A1 | 6/2014 | Zhou et al. | |
| 2017/0013579 A1 | 1/2017 | Stacey et al. | |

FOREIGN PATENT DOCUMENTS

| | | |
|---|---|---|
| CN | 101360033 A | 2/2009 |
| CN | 101815323 A | 8/2010 |
| EP | 0615364 A1 | 9/1994 |
| JP | H7-58688 A | 3/1995 |
| JP | 2005-6327 A | 1/2005 |
| JP | 2005-94169 A | 4/2005 |
| JP | 2007-6437 A | 1/2007 |
| JP | 2009-522938 A | 6/2009 |
| JP | 2010-258619 A | 11/2010 |
| JP | 2010-263349 A | 11/2010 |
| JP | 2011-244151 A | 12/2011 |
| TW | 200907719 A | 2/2009 |
| WO | WO 2010/131424 A1 | 11/2010 |

OTHER PUBLICATIONS

Li et al., "Improve TCP performance with a novel adaptive queue management scheme in IEEE 802.17 RPR optical networks", 2005.
Simeonidou et al., "Grid Optical Burst Switched Networks (GOBS)", 2006.
English language abstract of Chinese Patent Publication No. CN 101360033 A, published Feb. 4, 2009, retrieved from http://worldwide.espacenet.com, 2 pages.

(56) References Cited

OTHER PUBLICATIONS

English language abstract of Chinese Patent Publication No. CN 101296249 A, published Oct. 29, 2008, retrieved from http://worldwide.espacenet.com, 2 pages.
English language abstract of Chinese Patent Publication No. CN 101013926 A, published Aug. 8, 2007, retrieved from http://worldwide.espacenet.com, 1 page.
English language abstract of Chinese Patent Publication No. CN 101815323 A, published Aug. 5, 2010, retrieved from http://worldwide.espacenet.com, 2 pages.
English language abstract of Japanese Patent Publication No. JP 2005-94169 A, published Apr. 7, 2005, retrieved from http://worldwide.espacenet.com, 1 page.
English language abstract of Japanese Patent Publication No. JP 2007-6437 A, published Jan. 11, 2007, retrieved from http://worldwide.espacenet.com, 1 page.
English language abstract of Japanese Patent Publication No. JP 2009-522938 A, published Jun. 11, 2009, retrieved from http://worldwide.espacenet.com, 1 page.
Chung, S.H. et al., "The Design of Outsourcing Planning for Semiconductor Backend Turnkey Service," *Fourth International Conference on Networked Computing and Advanced Information Management*, IEEE Computer Society, pp. 701-706 (2008).
Frattasi, S. et al., "Heterogeneous Services and Architectures for Next-Generation Wireless Networks," *2nd International Symposium on Wireless Communication Systems*, IEEE, pp. 213-217 (2005).
Haartsen, J.C, "Bluetooth™: A new radio interface providing ubiquitous connectivity," *VTC2000*, IEEE pp. 107-111 (2000).
Han, J. et al., "Practical Considerations in the Design and Implementation of Time Synchronization Systems Using IEEE 1588," *IEEE Communications Magazine*, IEEE, pp. 164-170 (Nov. 2009).
Popovski, P. et al., "Device Discovery in Short-Range Wireless Ad Hoc Networks," *5th International Symposium on Wireless Personal Multimedia Communications*, IEEE, pp. 1361-1365 (2002).
Texas Instruments, "AN-1728 IEEE 1588 Precision Time Protocol Time Synchronization Performance," Application Report SNLA098A, 10 pages (Oct. 2007—Revised Apr. 2013).
Wu, H. et al., "IEEE 802.11e Enhanced Distributed Channel Access (EDCA) Throughput Analysis," *IEEE International Conference on Communications*, IEEE, pp. 223-228 (2006).
English language abstract of Japanese Patent Publication No. JP 2002-186009, published Jun. 28, 2002, retrieved from http://worldwide.espacenet.com, 1 page.

\* cited by examiner

GROUP FORMATION WITHIN A SYNCHRONIZED HIERARCHY OF PEER-TO-PEER DEVICES

RELATED APPLICATIONS

This application is a continuation-in-part of U.S. patent application Ser. No. 13/625,752, entitled "Selection of a Master in a Peer-to-Peer Network Environment", which was filed 24 Sep. 2012 and which claims priority to U.S. Provisional Patent Application Nos. 61/586,664 (filed 13 Jan. 2012) and 61/666,547 (filed 29 Jun. 2012). Also, the present application claims priority to U.S. Provisional Patent Application No. 61/708,471, filed 1 Oct. 2012. The preceding provisional patent applications are incorporated herein by reference. In addition, U.S. patent application Ser. No. 13/625,752 above also claims priority to U.S. Provisional Patent Application No. 61/561,736, (filed 18 Nov. 2011).

Further, the subject matter of the present application is related to subject matter of co-pending non-provisional U.S. patent applications having Ser. No. 13/625,766, entitled "Synchronization of Devices in a Peer-to-Peer Network Environment" and filed 24 Sep. 2012, and Ser. No. 13/657,707, entitled "Selection of Synchronization Stations in a Peer-to-Peer Network Environment" and filed 22 Oct. 2012.

BACKGROUND

This invention relates to the field of communications. More particularly, a system, apparatus and methods are provided for organizing a group of peer devices within a larger peer-to-peer networking environment.

Peer-to-peer network protocols or technologies allow individual nodes or devices to communicate directly with other peers, and may be contrasted with infrastructure-based environments in which a required central node (e.g., a server, a router, a switch, an access point) passes communications between different nodes. One benefit of direct peer-to-peer communication is that it avoids unnecessary additional routing and processing of communications through other devices.

However, existing peer-to-peer network technologies have limitations that diminish their usability, scalability and/or performance. For example, some technologies offer only limited peer-to-peer communication capabilities because they are focused on infrastructure-based solutions and therefore require a central node. Peer-to-peer communication in these environments requires negotiation with the central node, and may not be possible between devices that do not share a common central node. Also, communications between peers may be limited by the capabilities of the central node (e.g., frequency band, bandwidth, modulation).

Because of its prominent role, a central node may become congested and thus increase communication latency and decrease communication throughput within the environment. Further, a central node acts as a single point of failure. Even if another node can take over the functions of a failed or missing central node, until that occurs the network may be severely degraded.

Some other technologies that allow for peer-to-peer communications require significant power consumption by individual nodes, which is a principal concern for devices that rely on battery power (e.g., smart phones, tablets, laptop and notebook computers). Excessive power consumption by a peer might be caused by inefficient discovery of services and/or other devices, by having to act as a central node, by inefficient use of the device's transceiver, and/or for other reasons. For example, requiring a device to continually or regularly poll or query other devices will cause it to consume significant amounts of power, especially for a wireless device travelling through different spatial regions.

Yet further, some networking technologies or protocols that support peer-to-peer communications do not coexist well with other technologies. For example, in a wireless environment, typical peer-to-peer protocols are not flexible enough to share a device's radio, antenna or frequency spectrum with other protocols or between applications (e.g., to maintain a Bluetooth® connection). Some peer-to-peer technologies also do not permit multicast communications, instead requiring a device to contact multiple peers individually, and/or do not scale well as the environment becomes more densely populated.

SUMMARY

In some embodiments of the invention, systems, apparatus and methods are provided for organizing a group of peer devices within a larger peer-to-peer network environment. In these embodiments, all devices in the environment are arranged into one or more logical "default" hierarchies to facilitate their synchronization. A subset of the devices may be locally organized into a smaller "group" hierarchy, and may facilitate the exchange of data or sharing of an application among group members.

All peer devices in the environment maintain a default identifier configured to identify the default hierarchy to which they belong. Devices participating in a group also maintain a group identifier configured to uniquely identify their group or group hierarchy.

Within a group, member peer devices synchronize with a group root synchronization (or root sync) station that, in turn, attempts to synchronize with a device in a default hierarchy. The default hierarchy is similarly synchronized under a default root sync station. A default or group hierarchy may also include any number of subordinate branch synchronization (or branch sync) stations that facilitate the root sync station's synchronization of the hierarchy; all other devices are leaf stations. All sync stations issue regular synchronization frames to achieve and maintain synchronization among a hierarchy's members.

Different groups may merge if, for example, they come into proximity with each other or if they are using a common application. Illustratively, the group having the higher-rated group root sync station (e.g., according to a set of selection metrics or preference values) will subsume the other group. When a device leaves a group, it may attempt to re-synchronize with a device in a default hierarchy. In some environments, however, a member of a group may remain synchronized with a default hierarchy even while participating in the group's hierarchy.

DETAILED DESCRIPTION

Figure 1:
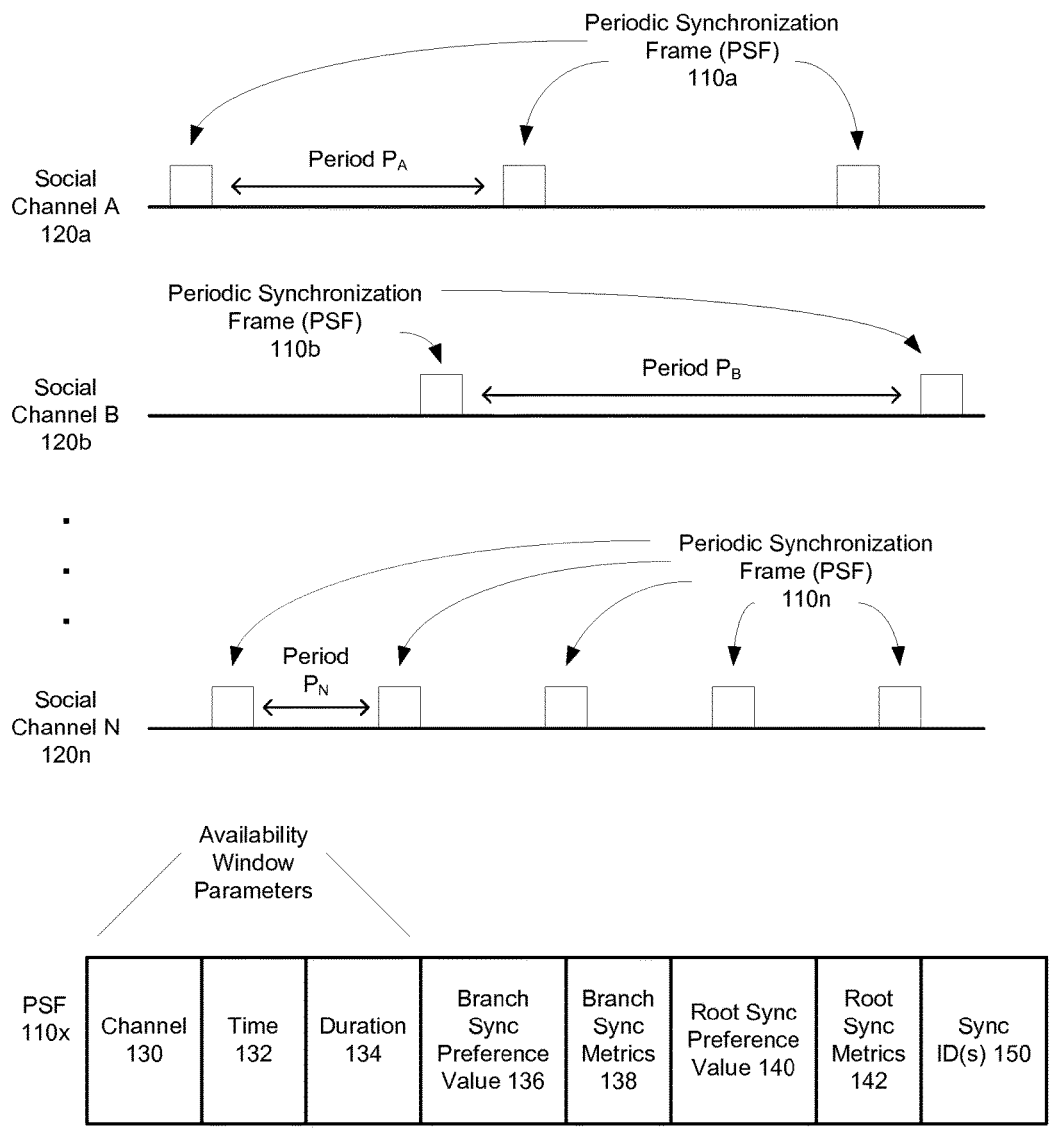
FIG. 1 depicts the use of periodic synchronization frames for achieving and maintaining synchronization among devices, according to some embodiments of the invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In some embodiments of the invention, a system, apparatus and method are provided for synchronizing devices operating in a peer-to-peer communication environment in a hierarchical community, while allowing for localized grouping of devices without leaving the community. Thus, a default hierarchy of devices provides a framework for synchronizing all devices in the environment, while individual groups or group hierarchies allow for local cooperation of devices without losing the ability to interact with devices in the larger hierarchy.

INTRODUCTION

A wireless communication environment may be characterized by any number of devices of the same type and/or different types—such as smart phones, tablets, personal digital assistants, laptop and desktop computers and so on. Different devices will have different features, may execute different applications, may have different power levels (e.g., battery strengths), different communication needs, different loads (e.g., on a processor, on an antenna), may be heard by other devices with varying signal strengths, etc. In addition, the communication environment may be fluid, with devices continuously entering, moving through and exiting the spatial region encompassing the environment.

Some embodiments of an invention disclosed herein provide for a protocol, mechanism and/or process for enabling devices in such an environment to discover each other and to communicate directly, peer-to-peer. These embodiments: promote low power consumption even while making devices and services readily discoverable; coexist with other communication technologies (e.g., Bluetooth®); support multi-band operation (e.g., 2.4 GHz and 5 GHz); avoid the throughput and latency degradation usually encountered with network infrastructure (e.g., access points) while maintaining compatibility with infrastructure-based technologies; easily and quickly recover if and when a device acting as a synchronization station (or master) exits the environment; and are scalable to accommodate dense environments having many devices. These and other features and advantages are described below.

In embodiments of the invention, devices are synchronized so that they rendezvous at predetermined times on predetermined channels. A period of time during which devices rendezvous is termed an availability window, and all synchronization (or sync) stations broadcast or advertise the same, or similar, schedules of availability windows. During an availability window, peers may exchange multicast and/or unicast data communications, and discover other devices and services. A device may extend its attendance at an availability window to accommodate ongoing communication with a peer.

Parameters of one or more upcoming rendezvous (e.g., time and channel) are communicated via Periodic Synchronization Frames (PSF) broadcast on one or more social channels. Devices are pre-programmed to periodically listen on at least one social channel, for a length of time sufficient to hear at least one PSF.

Thus, when a device boots or moves into an environment of peer devices, it will tune to a predetermined social channel and quickly learn where and when it may rendezvous with other devices. If the device does not hear a PSF, it may assume that it should act as a master and begin issuing its own PSFs to facilitate synchronization with other devices that may be present or that later appear.

Synchronization parameters (e.g., a schedule of upcoming availability windows) may also be announced during an availability window in some implementations, thereby saving the devices the expense of switching their radios to a social channel to receive the parameters. A device may even power off its radio when not listening for a PSF, participating in an availability window or using it for some other purpose. A device participating in a synchronized hierarchy may therefore share a radio, antenna and/or other communication resource with another function of the device, such as an infrastructure connection or a Bluetooth® link.

Within a community of peer devices, a selection procedure is applied to determine which will become sync stations and take on responsibility for synchronizing other devices. The number of synchronization stations selected may depend on the number of peer devices present, their signal strengths, signal propagation patterns, operating parameters, etc. As described below, the process of selecting or identifying sync stations may consider virtually any relevant factor of the participating devices.

Although devices in the communication environment engage in peer-to-peer communications without the burden of infrastructure requirements, the selection of synchronization stations or masters will logically organize the devices into a hierarchy for purposes of synchronization. Within the hierarchy, a root sync station (or "top master") is responsible for overall synchronization of the devices via synchronization parameters conveyed by the PSFs it broadcasts. Each subordinate master, called a branch sync station, synchronizes with the root sync station or an intervening branch sync station and retransmits or repackages the root sync station's synchronization parameters within its own PSFs, thereby extending the range of the overall synchronization.

The radio range of a single wireless device (e.g., the root sync station) is limited, which would normally prevent that device from organizing devices beyond a local region.

Requiring subordinate branch sync stations to rebroadcast its synchronization parameters allows that single wireless device to synchronize a collection of devices spread over a larger area. The entire community enjoys the resulting benefits (e.g., ready discovery of services and other devices, less power consumption).

Unlike an environment that has infrastructure requirements (e.g., coordination via an access point), because a synchronization station's principal task is simply to disseminate rendezvous parameters, loss of a sync station is easily rectified. For example, the rendezvous schedule published by the missing sync station will simply be maintained while a replacement is chosen, thereby keeping all devices synchronized. And, that replacement will generally maintain the same schedule.

Different algorithms for selecting synchronization stations, or masters, may be applied at different times and/or in different environments, but generally serve to promote any or all of these objectives: even spatial distribution of masters throughout the environment, a tunable density of masters within the environment and control of the size of the geographic area comprising the environment.

In some embodiments of the invention, the algorithm for selecting or identifying masters is executed regularly to ensure the most appropriate devices act as synchronization stations, based on various metrics or attributes of the devices. The selection process may also consider how many sync stations are already present in an area, how many sync stations a given peer device can hear, how far away they are (e.g., based on signal strength or some other measure of distance), etc.

Groups of devices within an environment may synchronize among themselves, separate from or in parallel with a larger, default, hierarchy. They may organize to share a file or execute a common application, for example. A group may mimic the default hierarchy and maintain internal synchronization by selecting one or more branch sync stations (or group masters), with the other devices (i.e., leaf or slave devices) synchronizing to the selected branch synchronization stations. A group root sync station (or "top group master") may synchronize with (or attempt to synchronize with) a member of a nearby or surrounding hierarchy.

Not all members of the group need be drawn from a single hierarchy. For example, in a spatial area adjacent to multiple hierarchies, a group may draw members from two or more of them.

In embodiments of the invention, a "default" hierarchy is a hierarchy that may comprise a relatively large number of devices (e.g., all devices within a given spatial area). Members of a default hierarchy will have (and advertise) matching "default" identifiers. A "group" hierarchy is composed of members of a private group. Members of a group hierarchy will have (and advertise) matching "group" identifiers.

Although all members of a group will typically also belong to a default hierarchy, individual members of a default hierarchy may or may not be members of any group hierarchy. Default and group identifiers are distinguishable from other device identifiers (e.g., IP address, MAC address, IMEI number, IMSI number).

Sections that follow discuss synchronization of devices within the peer-to-peer environment to form a default hierarchy, selection of synchronization stations or masters within a hierarchy, organization of groups of devices within a default hierarchy or across multiple default hierarchies, and an illustrative peer device, according to some embodiments of the invention.

Synchronization of Devices

As discussed above, synchronization of devices within a wireless communication environment according to some embodiments of the invention allows them to easily discover each other, identify available services and engage in direct peer-to-peer communications (unicast and/or multicast), all while conserving power resources and coexisting with other communication processes.

Synchronization commences as soon as a device comes online or moves within range of at least one other device operating a compatible protocol, and can be maintained as long as the device is online within the spatial area covering the synchronized devices (e.g., as long as it is in range of a peer device).

Through the synchronization and master selection processes, devices are automatically organized into a hierarchy, in which synchronization stations (or masters) at each level (or stratum) of the hierarchy periodically broadcast synchronization parameters in order to achieve and maintain synchronization among devices in an area. Periodic synchronization frames (PSFs) are one mechanism for disseminating synchronization parameters, and are consumed by all synchronized devices.

Periodic synchronization frames serve to convey information such as, but not limited to, information for synchronizing devices' clocks, a description of one or more upcoming availability windows during which synchronized devices can rendezvous, and metrics or attributes of the root sync station and the branch sync station that transmitted the PSF. In other embodiments of the invention, a PSF may include a different collection of information, but will normally include criteria identifying at least one availability window.

Formation of a hierarchy and synchronization of devices within it may be affected by configuration or operating parameters such as, but not limited to: a maximum depth or stratum, periodicity of PSFs, number of synchronization stations (e.g., overall and/or within range of a given device), the selection algorithm used to select sync stations or masters, device metrics or attributes considered by the selection algorithm, etc. In different embodiments of the invention, different parameters may be applied.

FIG. 1 depicts the use of periodic synchronization frames for achieving and maintaining synchronization among devices, according to some embodiments of the invention.

In these embodiments, periodic synchronization frames 110 (e.g., frames 110a, 110b, 110n) are transmitted on regular bases on one or more social channels 120 (e.g., channels 120a, 120b, 120n).

Different sync stations may transmit periodic synchronization frames on the same or different social channels, and any given sync station may use one or more social channels to carry its PSFs. Different sync stations in a single environment may use different social channels, perhaps to avoid interference with each other, because the social channel used by one master may be in use by a different master for a different purpose (e.g., an infrastructure connection), and/or for some other reason.

Although multiple social channels 120 are depicted in FIG. 1, in some implementations all master stations in one environment and hierarchy may use the same social channel. Social channels and/or other channels discussed herein may be IEEE 802.11 wireless channels.

On social channels 120a, 120b, 120n, respective periodic synchronization frames 110a, 110b, 110n are broadcast on a periodic basis by a responsible sync station. Each of the PSFs broadcast by a single synchronization station on a single channel (e.g., frames 110a) may be identical or may differ somewhat, such as in the schedule of availability windows that they convey.

Although the PSF period of each channel ($P_A$, $P_B$, $P_N$) is different in FIG. 1, in some embodiments of the invention in which multiple social channels are employed, the PSF periods of two or more channels may be identical. An illustrative period between PSFs on one channel may be on the order of 100 milliseconds. Different sync stations may use the same or different PSF periods. In some implementations, the length or duration of a PSF period may be inversely proportional to the overall number of sync stations (or the number of sync stations in a particular region) broadcasting PSFs.

In some embodiments of the invention, PSF periods will be different on each social channel; however, the availability window periods of the synchronization stations issuing the PSFs may be the same. Therefore, within one hierarchy, multiple PSF periods and a single availability window period may be implemented.

When transmitting a PSF, the issuing synchronization station or master merely needs to tune its radio to the correct channel and power it on long enough to send the PSF. It need not remain on that channel after issuing the PSF, but rather can turn off its radio to conserve power, switch it to a different social channel (e.g., to prepare to transmit a PSF on a different channel) or use it for some other purpose, such as attending an availability window (as described below), handling infrastructure communication, etc.

In different embodiments of the invention, a PSF may contain a subset or a superset of the elements of illustrative PSF 110x, or a completely different set of information elements. The synchronization parameters (or availability window parameters) of PSF 110x—the combination of channel 130, time 132 and duration 134—define one availability window during which synchronized devices can rendezvous. Channel 130 identifies the channel (e.g., an 802.11 wireless channel) on which they will rendezvous, time 132 identifies the time at which they will rendezvous, and duration 134 indicates a minimum duration of the window.

Synchronization parameters or data of a PSF may identify any number of availability windows (zero or more). Different PSFs transmitted on the same or different social channels, and by different masters, may identify the same or different availability windows. In some embodiments, however, synchronization parameters set by the root sync station (including the schedule or sequence of availability windows) are applied throughout the hierarchy.

Time element 132 of the synchronization parameters of PSF 110x may identify an absolute starting time (e.g., based on a synchronized clock, UTC (Coordinated Universal Time) or some other common reference) and/or a relative time. In some implementations, the timestamp field carries the TSF (Time Sync Function) of the station that issued PSF 110x.

In some embodiments of the invention, time 132 includes multiple values that a synchronizing device uses to compute the starting time of an availability window. In these embodiments, time 132 may include a "target" timestamp configured to indicate when PSF 110x was formed and queued for transmission within the issuing sync station (e.g., when the PSF was placed into a transmit buffer), and an "actual" timestamp configured to indicate when the PSF was actually dispatched via the station's antenna. The PSF is considered formed as of the time a "master offset" parameter is calculated by the sync station.

The master offset value, also included within PSF 110x as part of time 132 or a different information element, represents the issuing sync station's internal offset to the start of the next availability window, measured from the time it releases the PSF. In other words, the master offset measures the period of time from the target timestamp to the start of the availability window, as calculated by the station that issued the synchronization frame.

With these values, a device that hears or synchronizes with the station that issued PSF 110x can compute an offset to the starting time of the availability window as follows:

Offset=Master offset−(actual timestamp−target timestamp)

The synchronizing device thus receives the master offset and, from the target and actual timestamps, can measure how much of that master offset time period has elapsed; it then subtracts that elapsed period from the master offset to determine the amount of time remaining until the availability window.

Duration 134 of PSF 110x indicates the minimum amount of time, during the availability window, that the synchronization station that issued PSF 110x will be listening and available for communication. The duration may also apply to the synchronized devices; that is, a device that attends the window may be required to be available for at least that period of time, measured from the commencement of the window.

In some embodiments of the invention, a master device may automatically extend its availability window (e.g., in increments matching duration 134 or some other time duration) as long as at least one station is communicating with it. Thus, even if multiple stations wish to communicate with the master device, because the window will be extended, they may be able to do so without waiting for another availability window.

Similarly, a device that attends the availability window may extend its window as long as at least one of its peers engages it in communication. Therefore, one peer that wishes to communicate with another peer may simply issue a first set of packets, datagrams, messages or other units of communication to that other peer during an availability window. Both peers will then automatically extend their windows because of the active communication. Advantageously, this allows extensive peer-to-peer communication during availability window extensions without saturating or monopolizing bandwidth during the availability window.

A maximum duration of a sync station's presence during an availability window may be specified in PSF 110x and/or may be announced during the availability window. Illustratively, the sync station may need to depart the window in order to issue a PSF on a different channel, to use its radio for another communication function, or for some other reason. As for individual devices, they may depart an availability window after duration 134 if they have nothing to communicate and if no other device communicates with it during some period of time within the window.

Returning to FIG. 1, a preference value (alternatively termed a master preference value or a selection value) is a value (e.g., an integer) used to identify the suitability or preference of a device to be a master or synchronization station. A preference value is calculated using various metrics, attributes or characteristics of the corresponding device, and possibly characteristics of the communication environment or the device's hierarchy. Illustrative metrics for calculating a device's preference value include available power resources (e.g., battery strength, AC connection), processor load, signal strength and so on.

As described in the following section, preference values of synchronized devices are compared as part of a selection process to determine which devices should be synchronization stations. The process may be executed on a regular basis, such as during or after every sequence of availability windows, on a fixed schedule, etc.

In PSF 110x, branch sync preference value 136 is the master preference value of the branch sync station that broadcast PSF 110x, and indicates that station's suitability or preference to be a synchronization station within its default hierarchy. By advertising its preference value, all devices in range of that station can correctly apply the selection process and, for example, determine whether they are better suited to be a synchronization station.

Similarly, root sync preference value 140 is the master preference value of the root sync station for the default hierarchy in which PSF 110x was broadcast, and indicates that station's suitability or preference to be a synchronization station. As will be seen below, by propagating root sync preference value 140 throughout the hierarchy, a device at the fringe of the communication environment or in an area overlapping multiple separate hierarchies can determine which hierarchy to join. In addition, all devices in the synchronized hierarchy can determine whether they are better suited to be the root sync station.

Branch sync metrics 138 include various metrics or attributes of the synchronization station that issued PSF 110x, possibly including the metrics used to calculate branch synch preference value 136. Similarly, root sync metrics 142 include metrics or attributes of the root synchronization station of the default hierarchy. Beyond the data identified above, metrics 138 and/or metrics 142 may include a station's name and/or address (e.g., MAC address), name or address of the station's default root synchronization station, a timestamp, its level or stratum within the default hierarchy (or number of hops from the root), the periodicity of the station's PSFs, a social channel used by the station, etc.

When PSF 110x is issued by the root sync station of a default hierarchy, preference values 136, 140 will match and metrics 138, 142 will also match. Alternatively, one of the preference value fields and one of the metrics fields could be omitted.

Further, a PSF issued by a synchronization station operating within a group hierarchy may contain additional information elements for conveying preference values and/or metrics pertinent to the group. In particular, and as discussed in a following section, a master selection process is executed separately for default and group hierarchies, to select or identify devices to act as synchronization stations for each. The additional preference value(s) and/or metrics will relate to the issuing station's group.

In some embodiments of the invention in which metrics 138, 142 include data used to calculate preference values 136, 140, the preference values may be omitted from a periodic synchronization frame. Conversely, metrics 138, 142 may be omitted if preference values 136, 140 provide all the information needed by devices that consume PSF 110x (e.g., for purposes of identifying or selecting synchronization stations).

Synchronization identifier(s) 150 include identifiers assigned to the default and/or group hierarchies in which the station that issued PSF 110x participates. As described previously, a default identifier may be used to identify the overall hierarchy that encompasses all peer devices in a region. A group identifier may identify a private group of devices. Other synchronization identifiers may be used for other purposes.

In some embodiments of the invention, the default identifier for all devices within a hierarchy will normally be 0, and only a master device wishing to maintain alignment with an access point or other infrastructure device will use a default identifier having a value other than 0. In this case, the master device may derive its default identifier from the access point's BSSID (Base Service Set Identifier) using a predetermined algorithm, for example. A master device in this situation may only be able to synchronize with peers that also maintain alignment with the same access point.

A group identifier, however, may be set by a group root sync station, by another group member, at random or in some other manner, as described in a following section. A group identifier of 0 may be used by a device to indicate that it is not a member of any group. Thus, an idle peer device may have a default and group identifier pair of 0/0, indicating that while it is synchronized with a default hierarchy, it is not participating in any group. A peer device that is active within a private group may normally have an identifier pair of 0/x, wherein x is the number used by the device's group. A group may have any number of members.

In some implementations, a PSF may include information elements other than those depicted in FIG. 1. For example, a PSF may identify an algorithm for selecting synchronization stations or masters, specify constraints on sync stations (e.g., how many can be within range of each other), advertise a maximum depth for the device's hierarchy, provide a notification that a station is departing the network, etc.

Also, when a synchronization station that is a member of a group issues PSFs, those frames may include information elements specific to the group, in addition to or instead of group-specific preference values/metrics mentioned above. For example, a PSF issued by the station may include a group-specific set of elements that include some or all of: the station's preference value, its level or stratum in the group (or number of hops from the group root), name or address of the group root sync station, group identifier, and/or any other data relating to the group hierarchy and/or a default hierarchy to which the station belongs.

Although a synchronization station may have a stated period to the issuance of periodic synchronization frames, that period is flexible and there may be high tolerance for variation. A given PSF may be advanced or delayed in time because of other demands on the station's radio, because of contention on the communication channel or for some other reason. In some implementations, PSFs may vary on the order of +/−20 milliseconds every 100 milliseconds.

Periodic synchronization frames may be transmitted opportunistically, meaning that if a synchronization station's radio is tuned to a different channel at the time it would ordinarily issue a PSF on a social channel, it may instead issue the PSF on its current channel. PSF broadcasts will return to their normal schedule on the social channel(s) when able.

This type of situation, in which a PSF is sent on a non-social channel to identify a future availability window, can be very useful to a localized cluster of devices. Such devices likely will be associated with the same infrastructure network on the same (non-social) channel. Transmitting a PSF on this channel saves these devices the cost of a channel switch (i.e., to the social channel) and avoids interfering with their infrastructure communications.

In the worst case, a new device tuned to a sync station's normal social channel may miss a limited number of PSFs if the sync station is busy on a different channel. However, the sync station may be tuned to a commonly used frequency (e.g., an infrastructure channel required for a particular application, as described above), and may therefore reach the same device at a different time.

Figure 2:
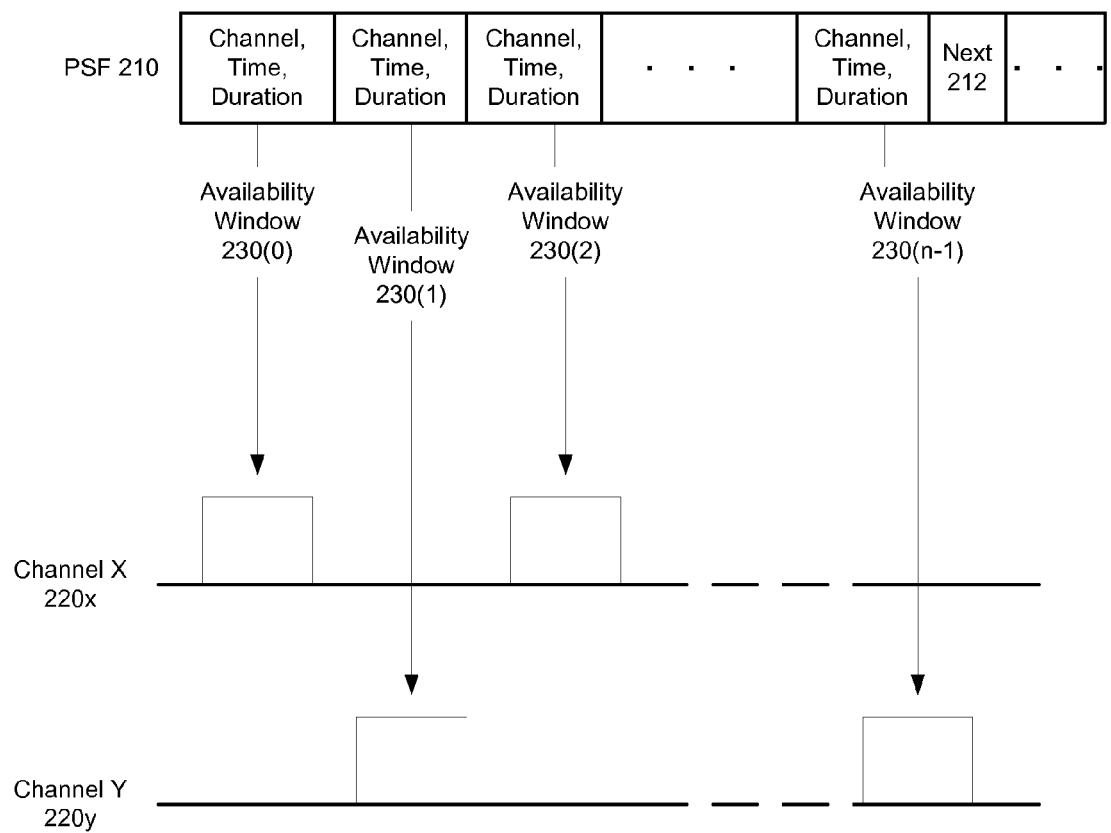
FIG. 2 is a diagram demonstrating a sequence of availability windows identified in a periodic synchronization frame, according to some embodiments of the invention.

FIG. 2 is a diagram demonstrating a sequence of availability windows identified in a periodic synchronization frame, according to some embodiments of the invention. All synchronization stations' availability windows may be scheduled for the same times, on the same or different channels, although this is not required in all embodiments of the invention.

Availability windows 230 of FIG. 2 are numbered and conducted as a repeating sequence. In particular, packet synchronization frame 210 comprises synchronization parameters that reveal a schedule of n availability windows, numbered 230(0) through 230(n–1). After one iteration, the availability window sequence numbers repeat (i.e., from 0 through n–1). A periodic synchronization frame may define any number of availability windows.

In addition to identifying a schedule for a partial or full sequence of availability windows, a PSF may identify which availability window sequence number is next, with an information element such as element 212 of PSF 210. A periodic synchronization frame may also include other information, such as the timing information described above for helping a receiving device correctly calculate the time remaining until the next availability window.

Among other information that may be included in a PSF is the issuing station's period for sending periodic synchronization frames, and the channel or channels the PSFs will be broadcast on. This allows a peer device to determine the maximum amount of time it must listen on a particular social channel in order to hear a PSF and learn the availability window schedule.

Instead of identifying discrete availability windows, in some implementations a PSF may report an availability window period, and individual devices can calculate when the windows will occur. For example, the PSF may provide timing or offset information to the next availability window, and report the issuing sync station's PSF period. Devices listening to the issuing sync station can then determine the sequence of availability windows. The PSF may also identify the sequence number of the current/next availability window.

Availability windows scheduled by a synchronization station may or may not occur at a regular period, and may or may not be synchronized with the station's PSFs. In other words, the availability windows need not occur at identical offsets from the PSFs. An illustrative duration of time that a full sequence of availability windows occupies may be on the order of five seconds, although a specific implementation of an embodiment of the invention may employ a shorter or longer duration.

In some embodiments of the invention, there is less tolerance regarding an availability window period than there is regarding a periodic synchronization frame period, perhaps on the order of +/–100 microseconds per second (compared to +/–200 milliseconds per second for PSFs). Whereas PSFs are very short (e.g., less than 1 millisecond) but issued frequently, availability windows are relatively long (e.g., longer than 50 milliseconds) and conducted infrequently (e.g., approximately one per second). PSFs may be scheduled opportunistically because of their short duration, but availability windows are configured for device discovery and communication, and therefore generally cannot be scheduled opportunistically.

Although infrequent, availability windows may monopolize a radio interface for a significant period of time; because of this, adherence to a strict schedule is advantageous, especially if other radio technologies are present (e.g., Bluetooth). Also, other (synchronized) devices are depending upon the advertised schedule of windows for discovery and/or peer communication, which leaves less room for variation.

Therefore, in some embodiments of the invention, a PSF transmission period will have a relatively high tolerance for variation, while an availability window period has a relatively low tolerance for variation. One advantage of this strategy is that it makes allowance for Wi-Fi contention that occurs at every periodic synchronization frame transmission. PSF transmission is only possible when the selected social channel is not in use, and contention for the channel or the radio may or may not delay issuance of the PSF. Therefore, strict scheduling of all PSF transmissions would be difficult to achieve.

When a peer device first synchronizes with a master and begins attending availability windows, in the first window (and/or the first window that all devices are required to attend) it may issue a message identifying itself, identifying its preference value, providing its selection metrics, advertising its services, etc. Any devices wishing to communicate with it can then make contact.

The n availability windows advertised via PSF 210 in FIG. 2 are conducted on two different channels 220x, 220y (i.e., channel X and channel Y, respectively), which are usually not social channels, but could be. Availability windows scheduled by a synchronization station may alternatively occur on the same channel or may be distributed among more than two channels.

Although availability windows are provided as a primary mechanism for peer devices to discover each other and services that are offered, a device (including a sync station) may skip one or more windows in a sequence. For example, if a peer device needs to use its radio for some other purpose during an availability window, it may not attend that window at all, may arrive late or may leave early. The device may or may not advise a sync station or other devices of its absence (e.g., via a multicast message).

In some embodiments of the invention, a device may set a "presence mode" for itself, and advertise this value to its synchronization station and/or other peers, to indicate how frequently it will tune into or attend advertised availability windows. In some implementations, a presence mode (or PM) is an integer value such as 1, 2, 4, etc. The reciprocal of the device's PM is a fraction indicating how many availability windows in a sequence it will attend. For example, if a device's PM=1, the device will attend every availability window; if its PM=2, the device will attend every window having a sequence number that is a multiple of 2 (i.e., ½ of the windows); if PM=4, it will attend every window whose sequence number is a multiple of 4 (i.e., ¼ of the windows).

Higher presence mode values allow a device to skip more windows and turn off its radio, thereby saving power. Ultimately, a presence mode equal to the number of availability windows in a sequence (i.e., n in FIG. 2) means that a device will attend only one availability window per sequence. A PM value of zero may indicate that a device is always available (i.e., not just during availability windows).

In some embodiments of the invention, every synchronized device must attend at least one availability window in the sequence advertised by its master. For example, devices may be required to synchronize during availability window 0 of each sequence. Thus, in this case, a PM value equal to the length of the availability window sequence indicates that the device will only be present during availability windows having sequence number 0.

The length of an availability window sequence is generally a power of 2 (e.g., 8, 32, 256). As shown in FIG. 2, sequence numbers of availability windows issued by a master begin at zero, and increase one at a time until reaching the value length−1 (e.g., 7, 31, 255), after which they repeat. A branch synchronization station is required to adopt and repeat (in its synchronization frames) the current sequence number of its master (i.e., the root sync station or another branch sync station). Therefore, all devices synchronized under one root synchronization station will agree on which availability window has sequence number 0.

In some embodiments of the invention, sequences of availability windows advertised by different synchronization stations may be of different lengths. However, all sequences will be aligned so that all devices having a particular presence mode value will attend the same windows. In other words, all devices will agree on which particular windows are multiples of a given number.

For example, consider a hierarchy in which availability window sequences of lengths 8, 16 and 64 are in use among different sets of devices (e.g., devices synchronized with different sync stations). Among the devices implementing the sequence of eight windows, every eighth window will be known as availability window sequence number 0. And, every availability window having sequence number 0 for those devices will be known as an availability window having sequence number 0 or 8 for those devices having a sequence that is 16 windows long, and as an availability window having sequence number 0, 8, 16, 24, 32, 40, 48 or 56 for those devices with 64 availability windows in their sequence.

A device may attend more availability windows than its PM indicates, but by announcing its presence mode value (e.g., via a multicast message in availability window sequence number 0), other devices will know when they can interact with it. And, as described previously, as long as one other device sends a communication to a device having the maximum PM value (equal to the length of the availability window sequence), during a window attended by the receiving device, that device will extend its presence on that channel in order to conduct the communication.

Further, in some embodiments, whenever a peer device having a presence mode greater than one (or some other threshold) receives a communication, it may automatically set its presence mode to one (or some other lower value) in order to facilitate the desired communication. Yet further, a device with a low presence mode (e.g., zero or one), after receiving a multicast frame in one availability window, may repeat it in one or more subsequent windows to help get it to its peers.

A synchronization station may have any PM value; although it sends synchronization frames at periodic intervals (possibly even during an availability window), it may shut off its radio or use its radio or antenna for other communications requirements during an availability window when it is not sending a synchronization frame.

The format of PSF 210 of FIG. 2 is merely illustrative; in other implementations the necessary information (e.g., synchronization parameters) may be conveyed in different forms. For example, a schedule of availability windows may be disseminated as a combination of channel, time, duration and period. In this format, the channel element identifies a communication channel, the time element identifies a starting time of an availability window, the duration element indicates a normal duration of an availability window, and the period element reports the period with which availability windows will be conducted.

In some embodiments of the invention, two or more peer devices wishing to conduct a relatively extended period of communication (e.g., for file transfer, to engage in a game or other application) may establish their own synchronization for the purpose of exchanging data, parallel to the overall synchronization, but outside of or in addition to scheduled availability windows. In these embodiments, one of the two or more devices may assume the role of a non-selection master, meaning that it does not participate in a master selection process as described in a following section, but is available for other devices to synchronize to or with (e.g., to conduct a file transfer, to play a game). Devices synchronized with a non-selection master may form a basic service set (BSS).

A non-selection master may issue synchronization frames that the other peer devices with which it will communicate will use to synchronize with the non-selection master, but which other devices in the community will ignore. Illustratively, these synchronization frames may be transmitted during an availability window or on an agreed-upon channel. A non-selection master's synchronization frames may specify that the device is a non-selection master, so that devices not needing to directly communicate with it will know that they should not synchronize with it.

A device that wants to synchronize or maintain synchronization with a community of peers may be unable to do so, perhaps because it cannot monitor the community's social channel(s), has other commitments during the scheduled availability windows, or for some other reason. In this situation, the device may become a non-selection master (and identify when it is available) to help other devices discover it. Alternatively, it may request a sync station to alter its synchronization schedule to accommodate the device (e.g., change the channel(s) and/or times of the sync station's availability windows), or may become a sync station if its selection preference value indicates that it should. As a synchronization station, especially as the root sync station, it could change the availability window schedule.

In some embodiments of the invention, during an availability window on a rendezvous channel a synchronization station or other device (e.g., a non-selection master) may broadcast a different type of synchronization frame called a master indication frame (MIF). In these embodiments, master indication frames provide information that helps peer devices achieve or maintain synchronization—either with a sync station that issues regular PSFs or with a non-selection master that devices may synchronize with to exchange data directly. A master indication frame may be sent during an availability window, but generally will not be sent on a social channel unless, for example, one is sent during an availability window that is occurring on a social channel.

A master indication frame may include any data that a periodic synchronization frame might include, and/or other information. For example, an MIF might be sent by a sync station to report that it will start using a different social channel for sending PSFs, might be sent by a non-selection master to report that it will have a window of availability on a particular channel at a particular time, might be sent by another device to report synchronization data it heard from some other sync station or to advertise its availability, etc.

When an availability window overlaps with the time a PSF would normally be sent (i.e., according to the issuing sync station's PSF period), the regular PSF may be sent on the channel on which the availability window is conducted (and not on the social channel). During availability windows that do not overlap with the expiration of a master's PSF period, the master may nonetheless send an MIF to ensure that devices synchronized with it have the necessary synchronization data without having to tune into a social channel for a regular PSF. However, a device may still periodically listen on one or more social channels to learn of other masters.

Because peer devices having presence mode values other than one may not attend every availability window, but may be required to be present during availability windows having sequence number 0, a synchronization station may by default always broadcast a PSF or MIF during those windows. Whereas PSFs are short but frequent, MIFs are longer and less frequent, and may pack extended service and device capability payloads.

It may be noted that periodic synchronization frames are sent frequently, usually outside of availability windows, in order to help non-synchronized devices synchronize with their peers. After a collection of devices is synchronized, those devices may only (or primarily) meet during relatively sparse availability windows, especially those devices that have adjusted their presence modes to use their radios less and thereby save power. To remain synchronized, these devices may rely on master indication frames sent during availability windows.

In some embodiments of the invention, devices are required to implement guard periods at the beginning of some (or all) availability windows, during which they listen and can receive communications, but do not transmit. In different embodiments of the invention, this restriction may or may not always apply to sync stations that issue regular PSFs, but generally will always apply to non-selection masters.

Figure 3:
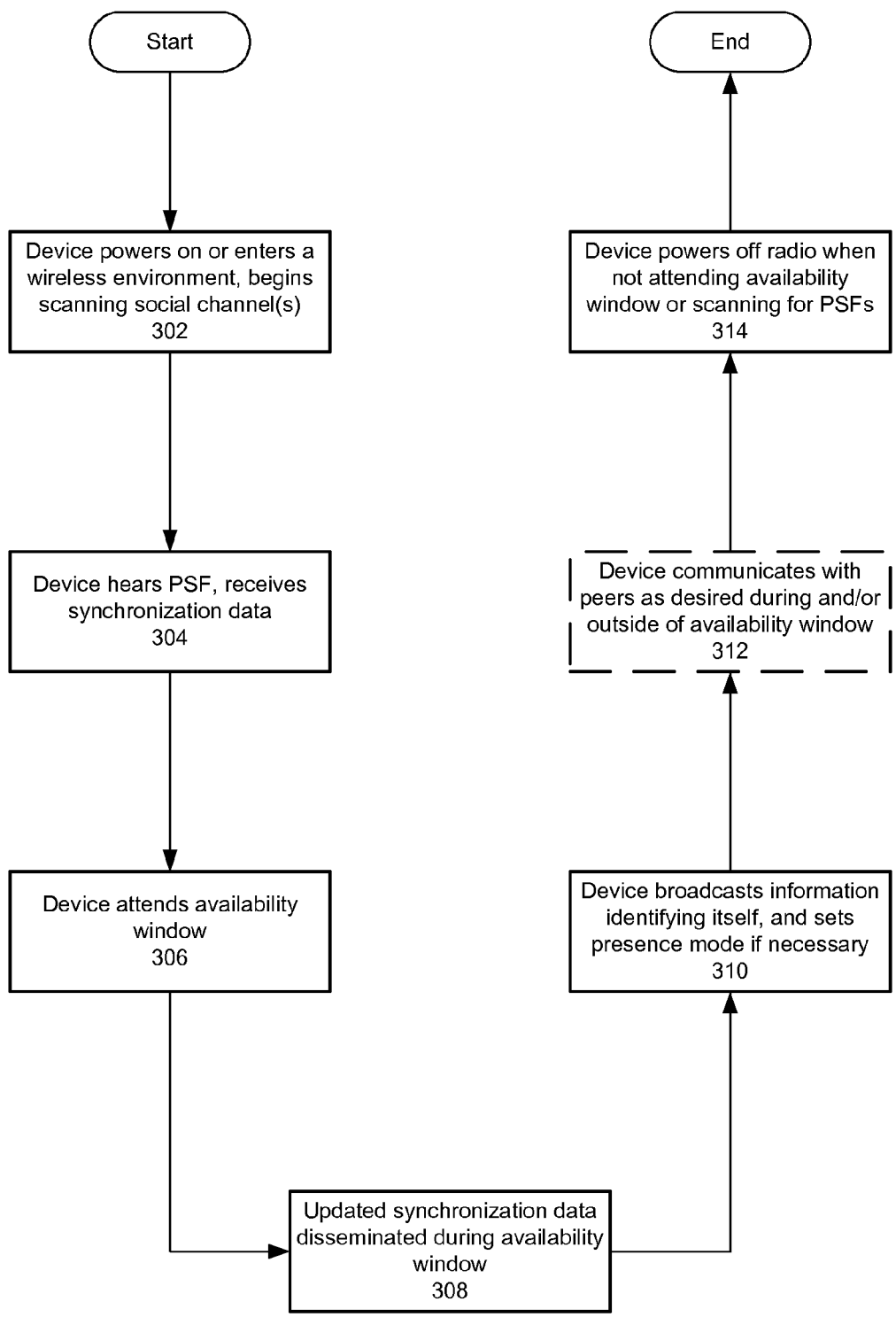
FIG. 3 is a flow chart demonstrating synchronization of a device with a community of peers in a wireless communication environment, according to some embodiments of the invention.

FIG. 3 is a flowchart demonstrating synchronization of a device with a community of peers in a wireless communication environment, according to some embodiments of the invention.

In operation 302, the device powers on or enters the environment and begins listening on one or more predetermined social channels for a periodic synchronization frame (PSF). It may be programmed with information regarding the default or possible periodicity of PSFs, and may therefore only need to listen on a given social channel for a limited number of those periods (e.g., one, two) in order to intercept a PSF broadcast by a synchronization station on that channel.

In operation 304, the device hears one or more PSFs and extracts their synchronization data. In the illustrated embodiment of the invention, all PSFs issued by synchronization stations within the same device hierarchy will advertise the same availability window sequence or schedule. The sync stations may transmit their PSFs on the same or different social channels, and may conduct the availability windows on the same non-social channels.

If the device did not hear any periodic synchronization frame, it may assume that there is no synchronization station within range. Therefore, it may take on the role of root sync station and begin issuing its own PSFs in order to synchronize other devices in range. As described in a following section, a process for selecting sync stations may be regularly or even continually applied to identify the devices that should be masters.

In operation 306, the device tunes its radio to the specified channel and attends the next availability window, assuming that its radio is not preempted by another application or service. If it cannot attend, the device will attend the next availability window that it can, although it may need to listen on a social channel again to receive the next set of synchronization data and learn its channel and starting time. The device may postpone attending an availability window until the start of the next sequence of windows, and therefore tune into the next required window (usually a window having sequence number 0).

In operation 308, during an availability window, a synchronization frame is broadcast by the synchronization station with which the device is now synchronized (e.g., a PSF or an MIF). This may relieve the device of the need to scan one or more social channels. The synchronization frame illustratively may be transmitted during an initial guard period or quiet period at the beginning of the availability window, during which devices that are not sync stations (e.g., leaf devices) may not transmit.

In operation 310, the device sets its presence mode if necessary or desired (e.g., if the device cannot attend the full sequence of availability windows). During at least the first availability window that it attends, and/or the first availability window having sequence number 0, the device identifies itself (e.g., address, name, service information) in a message broadcast to all synchronized devices. It may advertise its presence mode at the same time.

In optional operation 312, the device may communicate directly with one or more of its synchronized peers during the availability window and/or out-of-band, or they may communicate with the device. As discussed above, the device may extend its attendance at the window one or more times in order to facilitate the communications, will advertise to its active peers if and when it must leave the window (e.g., to use its radio for some other purpose), and may arrange a separate rendezvous off-channel with another peer.

In some embodiments of the invention, traffic reduction or limitation measures may be implemented during some or all availability windows in order to reduce communication congestion and collisions. Illustratively, the synchronization station that controls the availability window sequence may specify when a measure is in place. In some implementations, traffic reduction measures are only applied during availability windows, and not during availability window extensions. In mandatory availability windows (i.e., availability windows having sequence number 0), traffic reduction measures may be mandatory.

By way of example, a traffic reduction measure may serve to limit a device regarding the number of multicast frames it may transmit during one availability window (e.g., approximately three). Transmission of unicast frames may also be limited.

For example, unicast transmissions may only be permitted to (and/or from) devices having unknown presence mode values or values greater than one (or some other threshold). Limitations on unicast or multicast frame transmission may not apply to devices synchronizing among themselves (e.g., with a non-selection master) for a limited purpose, such as file transfer.

In operation 314, the device may power off its radio when not needed to listen for PSFs on a social channel or to attend an availability window.

The method of the invention depicted in FIG. 3 is merely illustrative, and does not limit methods according to other embodiments of the invention.

As described above, two or more peers may engage in their own synchronization, outside of or in addition to any availability window. For example, one of them may assume the role of a non-selection master and issue master indication frames or other synchronization frames during an availability window, to advise its peers as to when and where (i.e., time and channel) they may synchronize with it.

However, one peer may desire a short communication exchange with another peer without synchronizing. For example, a device synchronized with one hierarchy may wish to discover services offered by a peer (or peers) synchronized within a different (e.g., neighboring) hierarchy, may wish to poll a neighboring peer, etc. At least initially, they do not intend to engage in a significant exchange of data (e.g., as with a file transfer). Some embodiments of the invention provide this ability in the form of out-of-band inquiries and responses.

More specifically, a first peer may hear a synchronization frame of a neighboring hierarchy and thereby learn its schedule of availability windows. If able, it may attend one or more of the neighboring hierarchy's availability windows and thereby discover other devices, and it may send out-of-band frames to one or more of the neighboring devices.

Figure 4:
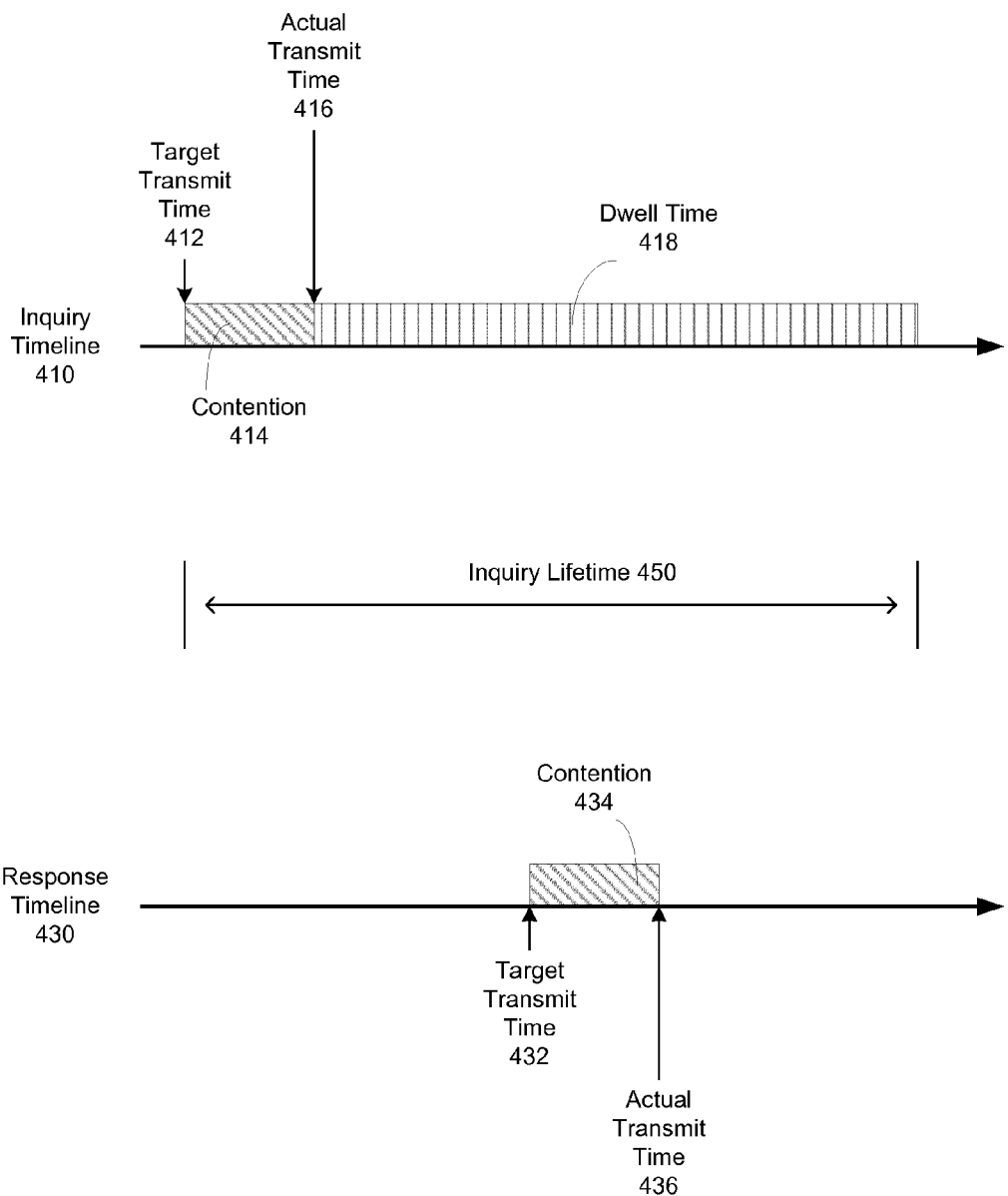
FIG. 4 is a diagram demonstrating an out-of-band exchange according to some embodiments of the invention.

FIG. 4 is a diagram demonstrating an out-of-band exchange according to some embodiments of the invention. As with the timing of periodic synchronization frames described above, the transmitting device must consider delay that will occur within itself, between the time it releases or prepares the inquiry for transmission and the time it is actually transmitted.

Inquiry timeline 410 reflects activity at the inquiring device, while response timeline 430 reflects activity at the responding device. When issuing the inquiry, the inquiring device must choose a suitable inquiry lifetime 450, such that the responding device will have time to receive, process and react to the inquiry.

In the illustrative inquiry and response, the inquiry is queued for transmission from the device at target transmission time 412. Because of contention for the antenna or the medium, and/or other delay (collectively represented as contention 414 in FIG. 4), the inquiry is not physically transmitted until actual transmit time 416.

Dwell time 418 is the remainder of the inquiry lifetime, during which the responding device must receive the inquiry and generate and transmit its response. The duration of dwell time 418 depends on the inquiry lifetime set by the inquiring device and the duration of contention 414. The responding device may also experience delay between its target transmit time 432 and the actual transmit time 436 of the response; this delay is represented as contention 434.

The inquiry may identify (in the out-of-band inquiry) any or all of the relevant time parameters (e.g., inquiry lifetime, target transmit time, actual transmit time, contention), so that the responding device can determine whether it will be able to respond before the inquiry expires. If not, it may drop the inquiry or abort its response. If the inquiring device does not receive a response during the inquiry lifetime, it may retry (e.g., with a longer lifetime), abandon the inquiry or take other action.

In some embodiments of the invention, a peer device may issue out-of-band inquiries to a sync station that it can hear, but which it is not synchronized to, in order to identify services offered by that sync station and devices synchronized to that station. In some implementations, it may relay information regarding other sync stations to its synchronized peers, such as during one or more of their availability windows. Information about another sync station (or other peer device) that may be revealed may include things such as a social channel it monitors, its availability windows (e.g., time, channel, period), master offset, services it offers, address, etc. An out-of-band inquiry may thus function as a quasi-PSF or quasi-MIF, in that it can allow a device to synchronize to the hierarchy of the sender of the inquiry.

Some unsynchronized masters (e.g., sync stations to which no leaf devices or subordinate masters have synchronized) may adopt a low-power mode of operation. This low-power mode of operation may be indicated in the station's synchronization frames, or may be inferred by the sequence or schedule of availability windows and/or the presence mode advertised in the synchronization frames.

In one such mode of operation, an unsynchronized master may still send periodic synchronization frames, but provide short availability windows having long periods (e.g., multiple seconds). Because of the short, sparse nature of the availability windows, it may take some time for a peer to discover services offered by the unsynchronized master.

During synchronization of peers within a communication environment according to some embodiments of the invention, as peer devices are organized into a hierarchy, leaf (or slave) devices synchronize with branch sync stations within range; those stations (and possibly other leaf devices) synchronize with higher branch sync stations, and so on, with one root sync station providing synchronization information for the entire environment. A leaf device may synchronize directly with the root sync station if it is in range.

An operating parameter of devices within an environment may specify the maximum depth of the devices' hierarchy, which may be defined as the number of levels or strata of synchronization stations. The root sync station's position is defined as stratum zero, and branch sync stations will reside in strata numbered 1 through D, wherein D is the maximum stratum at which a synchronization station may reside.

By default, while the hierarchy is being organized, a peer device may issue periodic synchronization frames until it falls into position as a leaf, at which time it stops transmitting PSFs. A device may choose to be a leaf, even if the applicable selection algorithm could otherwise make it a sync station, unless there is no synchronization station in range of the device. If there is no sync station in range, the device must take on that role.

All masters continue to issue PSFs to maintain synchronization within their areas, and may do so with a periodicity that is a function of its level, or stratum, within the hierarchy. For example, the root sync station at stratum 0 may issue PSFs on the order of every 100 milliseconds (ms), a branch sync station at stratum 1 may issue PSFs on the order of every 150 ms, a branch sync station at stratum 2 may issue PSFs every 500 ms, and so on. These values are merely exemplary and in no way limit or restrict the duration of PSF periods; synchronization stations within different strata may employ the same period, and sync stations in the same stratum may employ different periods.

A master's stratum will usually be reported within its PSFs. This information allows a listening device to determine how deep the hierarchy is within its area of the environment. Depending on that depth and/or other information (e.g., how many sync stations it can hear issuing PSFs, the maximum hierarchy depth), the device may be able to determine that it should be a leaf or that it should continue issuing PSFs and remain a synchronization station.

A hierarchy's maximum depth parameter may be programmed into devices and/or advertised within periodic synchronization frames. Other restrictions may also be imposed, such as a maximum number of sync stations, a requirement that a sync station only continues in its role as long as it can hear no more than a threshold number of other masters (e.g., within a particular range, at a particular stratum, overall), etc.

For example, where the hierarchy's maximum depth is D, a sync station situated at stratum S≥1 (i.e., all strata except the root) may only be allowed to hear D−S other sync stations operating in stratum S and still continue to serve as a sync station (assuming those other masters have higher or better selection preference values). This provision may allow for concentration of higher level branch sync stations near the root synchronization station, and dispersion of branch sync stations further away.

In some embodiments of the invention, a selection algorithm or process may prefer to retain an incumbent sync station over another device that would otherwise be given preference, unless the other device's selection preference value exceeds the incumbent's by a threshold. This may help avoid thrashing or excessive switching of sync stations. However, because a sync station's principal task is simply to broadcast synchronization data, switching sync stations does not impose a high transaction cost on the hierarchy or an individual device.

In some embodiments of the invention, a device will synchronize with the best sync station that it can hear (i.e., the sync station having the highest preference value), or the best sync station that it can hear within a given range (e.g., with a signal strength above a particular threshold).

When a device comes online in an environment and listens for PSFs, if it only hears from a branch sync station at the deepest or maximum stratum of the hierarchy, it may synchronize to that station as a leaf. If, however, the device can also hear another sync station in a different hierarchy (e.g., as determined by the root sync station attributes advertised in a periodic synchronization frame), it may favor joining that hierarchy if that other sync station is not at the maximum depth or stratum or if that other sync station has a better selection preference value.

A device that can only hear other devices relatively deep in the hierarchy (e.g., high strata values), may be able to determine that it is at the fringe of the environment. If most or all of the other devices are already at the maximum depth, a new hierarchy may spawn, especially if a device with a high preference value appears.

A new environment/hierarchy may also spawn when an existing one spans too large a spatial area. For example, a combination of the depth of the hierarchy, a measure of how close peer devices are and/or other factors, may cause a new hierarchy to be spawned. As discussed in the following section, signal strengths detected between peers may be one way of determining how close the peers are.

Requiring peers to synchronize only with masters relatively close to them may cause the hierarchy to be relatively compact. In contrast, a high limit on the maximum depth of the tree may allow the hierarchy to cover more area. By adjusting these (and/or other parameters), a suitable hierarchy may be formed.

Different parameters for configuring a hierarchy will be suited to different environments, depending on the density of devices, the communication load and/or other factors. For example, if the load is relatively light (e.g., the devices are low-power sensors), drawbacks associated with a hidden node problem should be limited and a relatively deep hierarchy may be implemented (e.g., on the order of ten to fifteen levels). Also, in sparser environments, a process for selecting sync stations described below will resolve more rapidly.

The hidden node problem refers to a scenario in which multiple devices that are not in range of each other try to communicate with a common peer. Because they cannot hear each other's transmissions they cannot avoid them, and their communications to the common peer may collide. Although this may be exacerbated by the need to communicate during a relatively short period of time (i.e., within an availability window), the light load may help mitigate the problem and allow a deeper hierarchy than would be possible in a dense environment with a heavier load.

Without a method of synchronization described herein, the total number of discovery frames needed to discover all devices in an environment could approach the square of the number of devices (i.e., each device might need to send at least one frame to every other device). These frames would be sent at random times and on any channels.

In contrast, the collective synchronization afforded by embodiments of the present invention enables synchronization based on regular transmissions from a select set of devices (i.e., sync stations), and scales well. In a perfectly synchronized environment, the number of frames needed for all devices to discover each other is proportional to the number of devices. One discovery frame broadcast during an availability window having sequence number 0 will reach all other devices in range.

Selection of Synchronization Stations

In different embodiments of the invention, different algorithms may be applied to determine which peer devices should be synchronization stations (also known as masters). The algorithm applied within a given environment usually will be symmetrical, meaning that every device uses the same data regarding itself and its peers, and the same criteria regarding those data, and so every device will come to the same conclusion regarding which device should be the root synchronization station and which other devices should be branch synchronization stations. In some embodiments, the specified selection algorithm is executed before, during or after each availability window (and any extensions to that window), or after some configurable number of availability windows.

As described in the preceding section, one device parameter that may play an important role in selecting sync stations is the master preference value, which indicates the preference for that device to be a sync station, or master.

Each device's preference value is derived in the same way, using the same metrics (the "selection metrics") or attributes of the device. Illustrative selection metrics include available power (e.g., battery strength), whether the device is connected to an AC (alternating current) power source, the type of device, device configuration (e.g., features, resources), whether (and how many) applications or utilities require use of the device's radio, whether the device has multiple antennas and transceivers, whether the device can operate on multiple bands (e.g., 2.4 GHz and 5 GHz), processor load, transmission contention, presence mode and so on.

In a simple implementation, a device's preference value may be an integer value that is proportional to its remaining battery power. A particular, high, value may indicate that the device is connected to AC power. A tie among multiple devices' preference values may be resolved by comparing network (e.g., MAC) addresses, IMSI (International Mobile Subscriber Identity), IMEI (International Mobile Equipment Identity) or some other unique characteristic of the devices.

In some implementations, devices may communicate just their preference values to each other, but may also or instead communicate the selection metrics used to calculate the preference values. As discussed previously, the preference value and/or selection metrics of the hierarchy's root sync station may be included in all periodic synchronization frames, a branch sync station's data may be included in the PSFs that it issues, and leaf devices' data may be announced during availability windows.

In some embodiments of the invention, the peer device having the highest preference value becomes the root sync station of the environment's default hierarchy. Branch sync stations may also be selected to expand the area of synchronization, and other peers will be leaf devices (or slaves). Every device, except the root sync station, synchronizes to either the root sync station or one of the other synchronization stations.

In some embodiments of the invention, besides being deployed at specific strata within the hierarchy, other peer devices may be categorized relative to a given device by how physically close they are to that device. For example, in one implementation, a given device may categorize peer devices that it can hear into one of three ranges: "close range," "mid-range" or "far range."

Range measurements or estimates may be derived from received signal strength indications (RSSI) and/or other indications of distance (e.g., GPS data). By way of illustration and not limitation, "close range" may be defined as approximately 5 meters, "mid-range" may be defined as approximately 10 meters, and "far range" may be defined as approximately 15 meters or further.

Other ranges (more or fewer than three) may be used in other implementations. For example, a device may consider just one range, which may correspond to one of the close range, mid-range or far range estimates above, or some other range or signal strength. To avoid boundary conditions, a peer device may need to be heard with at least a threshold RSSI in order to be considered in the selection process.

A selection process may operate on a regular basis, such as after (or during) every availability window, after every complete sequence of availability windows or on some other schedule. A device that is a member of a group may execute selection processes separately for its group hierarchy and its default hierarchy. For example, it may first execute an appropriate selection process within the group to find its role/position, and then run the selection process again to determine its role/position within the default hierarchy. The two processes may be the same or may be somewhat different.

When it executes a master selection process, a new device that enters a synchronized communication environment may usurp an existing synchronization station, a device that is a leaf or a lower branch synchronization station in the hierarchy may move up (e.g., because other devices having better preference values have departed), another device may move down from being a branch sync station to being a leaf, etc.

After a device takes position as a leaf or a sync station within the hierarchy, it will continue to listen to synchronization frames to determine if it is better suited to be a sync station than the stations sending those frames. For example, it may continually collect and process devices' preference values or selection metrics to determine whether other devices are better suited to be sync stations than the device itself.

As a device hears synchronization frames from different peers, it may assemble a list of masters that it hears and/or that are identified in the frames. This allows the device to periodically determine whether it should be a master and start issuing synchronization frames. Such a determination may depend on its preference value (or selection metrics) versus those of the other devices, how many masters it hears, how far away those master devices are, and/or other factors.

Figure 5A:
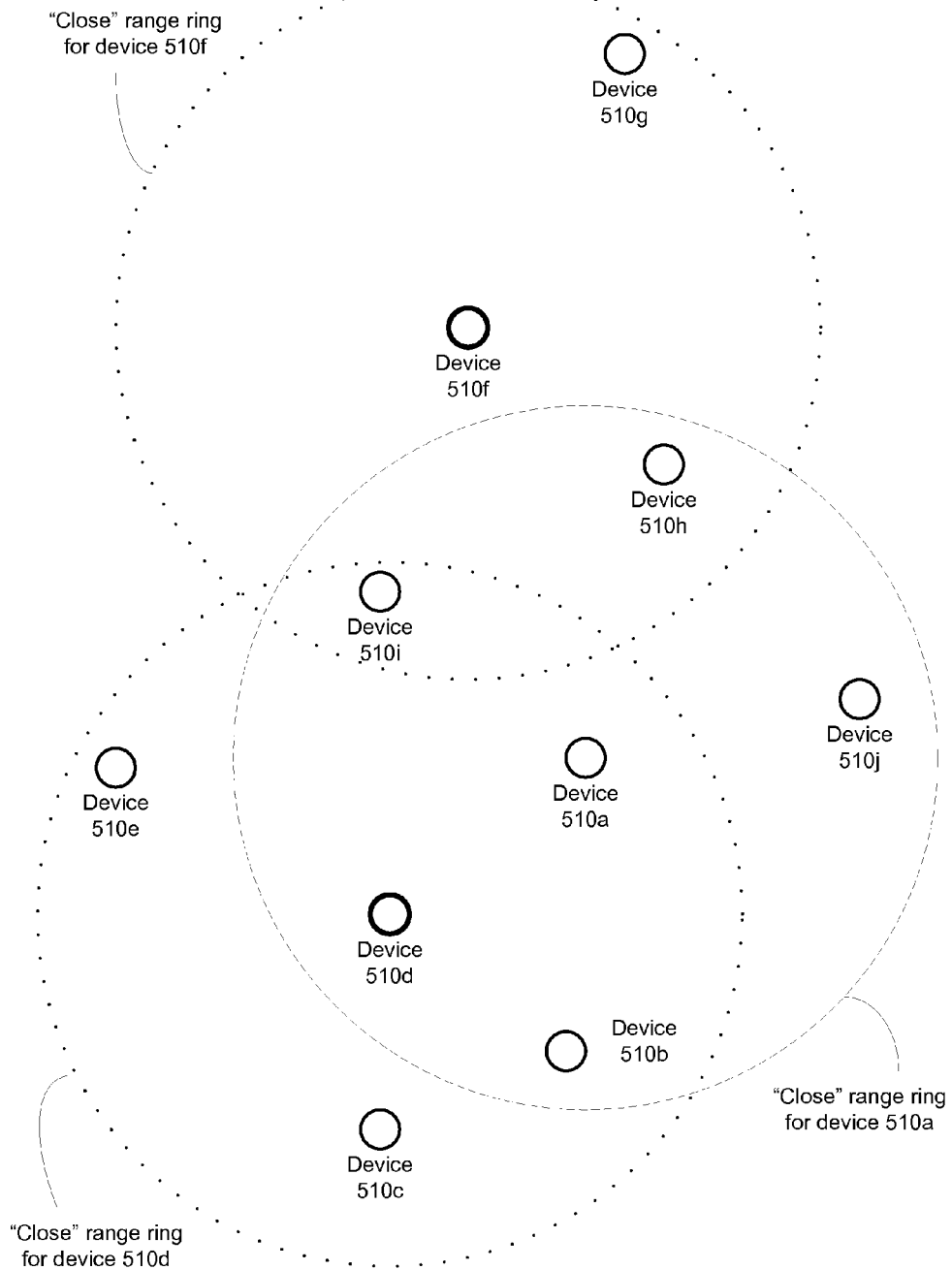
FIGS. 5A-D depict the selection of synchronization stations within a collection of peer communication devices, according to some embodiments of the invention.

FIG. 5A depicts a collection of peer communication devices that may select sync stations and synchronize within a single default hierarchy, according to some embodiments of the invention. In the illustrated scenario, peer devices 510 come online or enter their environment simultaneously or nearly simultaneously, thereby requiring all devices to determine suitable positions for themselves in the hierarchy at approximately the same time.

When devices 510*a*-510*j* come online, they will listen on at least one designated social channel. This channel may be programmed in the device's firmware, may be programmed by a service provider as part of the provisioning process, or may become known to the devices in some other way.

They each listen for the duration of time equal to or greater than one known or default PSF period (e.g., 100 ms), during which a synchronization station (a branch or the root) would normally broadcast one periodic synchronization frame (if present). Because no other devices were present in the illustrated environment prior to the appearance of devices 510, they do not hear a PSF. In some implementations, a device may listen on multiple different social channels and/or may listen for a longer time (e.g., multiple PSF periods) before assuming that no sync station is present.

Because no master device is detected, they all decide at approximately the same time that they should act as sync stations, and therefore they all commence issuing PSFs. As described in the preceding section, the PSFs advertise a sequence of one or more availability windows, specify which stratum they are operating at (in this case, stratum zero or the root), report their default and group identifiers, and also provide the issuer's preference value and/or selection metrics.

For purposes of describing an embodiment of the invention, in FIG. 5A device 510*f* has the best (e.g., highest) preference value, followed by device 510*d*. The maximum depth of a hierarchy is two, meaning that there will be only two levels or strata of masters—the root sync station (at stratum 0) and one level of branch sync stations below it (at stratum 1). All other peers will be leaf devices synchronized to the sync stations.

Because they all issue PSFs, all the devices will detect at least one peer's periodic synchronization frames. Despite collisions, interference and retransmissions, each device will become aware that there are peers acting or attempting to act as synchronization stations.

Each device will either continue to issue PSFs or will stop, depending on its preference value, other peers' preference values, and/or other factors. Because all devices broadcasting synchronization frames report their preference values (or their selection metrics), the devices can easily be compared to determine which should be synchronization stations.

In the embodiment of FIG. 5A, a device may be programmed to automatically cease issuing PSFs if it hears a threshold number of sync stations (e.g., overall, within a particular stratum, within a particular range), especially if these other devices' have better or higher master preference values. In particular, all the devices assumed they were the first master, and so their PSFs will indicate that they are at stratum 0 (i.e., the root). Because the threshold of synchronization stations at that level is configured to be one (i.e., there can be only one root synchronization station), as soon as a device hears one PSF from a peer operating at stratum 0 that has a better preference value, it should stop issuing PSFs.

However, as described above, in some embodiments of the invention devices first synchronize with sync stations close to them, before the devices look further out. Therefore, they may at first only compare themselves (their selection metrics or master preference values) with devices they detect (e.g., based on RSSI) as being within close range (e.g., five meters).

A master selection algorithm or process may provide for a maximum number of synchronization stations within each of multiple ranges. A device competing to be the root synchronization station (or top master device) within a first range (e.g., "close" range) will cease competing (and stop broadcasting synchronization frames) when it recognizes a number of better qualified devices within that range that meets or exceeds the maximum number of sync stations for that range (i.e., one). Similarly, a device competing to be the root synchronization station within a second range (e.g., "far" range) will cease when it recognizes a number of better qualified devices within that range that meets or exceeds the maximum number of sync stations for that range (i.e., also one).

By synchronizing first with a "close" master, the environment tends to aggregate into local clusters, at least initially. This can help reduce interference, and also reflects realistic situations, in which a user of a device is often sharing data with another user close to him or her, rather than someone further away. By subsequently looking further outward, clusters of devices can discover and synchronize with the larger environment.

In the environment depicted in FIG. 5A, two ranges are considered—"close" and "far." As discussed previously, categorization of a device as being close or far may depend on the strength of a signal between the two devices and/or other factors. In other embodiments, other ranges may be considered.

In FIG. 5A, "close" range rings are illustrated for the two devices with the best master preference values (devices 510*f*, 510*d*). The close-range ring is also shown for an illustrative device that will not become a sync station—device 510*a*.

To continue the narrative from above, because every device understands that there can be only one root sync station (at stratum 0), they all cease issuing PSFs if there is a device with a higher preference value within close range. This means that within their respective close ranges, only devices 510*f* and 510*d* continue issuing periodic synchronization frames; each thus becomes the root sync station within its own close range. Therefore, in this illustrative scenario, at least two separate default hierarchies temporarily exist—one rooted at device 510*f* and one rooted at device 510*d*. As will be seen shortly, they will merge.

The other devices within range of these two root sync stations synchronize to them and may begin attending their availability windows. Note that device 510*i*, which is within close range of both of the root sync stations, synchronizes to device 510*f* because it advertises a better master preference value than device 510*d*.

Now that each device recognizes its root synchronization station, each device that is not a level 0 master may determine whether it should bid to be a master at stratum 1. This determination may depend upon factors such as maximum depth of the hierarchy, how many other master candidates it hears at that level (if any), how close it is to those other master candidates, the devices' preference values, etc.

In embodiments of the invention reflected in FIGS. 5A-D, an operational or configuration parameter for the environment may dictate that, at a given stratum or level, a device will assume that another synchronization station is needed (and that it is a candidate for that position) unless it can hear some threshold of other sync stations at that stratum that have better selection preference values.

In the example depicted in FIGS. 5A-D, at stratum 1 and with the maximum depth of a hierarchy being 2 (e.g., two layers of sync stations, at strata 0 and 1), perhaps a device can only bid to become a stratum 1 branch sync station if it doesn't hear any other sync station at that stratum (or any other branch sync station within a particular range). In other words, there can be only one branch synch station at stratum 1 within range of any other device. Any device that hears PSFs from a stratum 1 sync station will refrain from transmitting its own PSFs and bidding to become a master device in stratum 1, as long as that sync station that it hears has a higher master preference value.

Therefore, in FIG. 5A, some devices other than devices 510*f* and 510*d* will issue PSFs advertising the same availability windows as their root sync stations (510*f*, 510*d*), but reporting their own stratum (i.e., 1) and their preference values. Devices that hear these peers' PSFs will halt their own bids to become level 1 masters if their preference values are worse, but will continue if they are better.

Therefore, at least one of devices 510*g*, 510*h*, 510*i* will become stratum 1 branch sync stations under root sync station 510*f* Similarly, at least one of devices 510*a*, 510*b*, 510*c*, 510*e* will become a stratum 1 branch sync station under device 510*d*. Because they are currently only selecting close-range masters, and because of the distances between the peers, more than one stratum 1 branch sync station will actually be selected in the separate hierarchies.

Other devices that are in close range to the root sync stations but that have insufficient master preference will be leaf devices (or slaves) and will remain synchronized with a sync station. The stratum 1 branch sync stations will extend the range of the hierarchy and help bring more devices into synchronization.

For example, device 510*j*, which is beyond close range for both device 510*f* and device 510*d*, may have established its own single node hierarchy. It will be recalled that all devices 510 came online simultaneously and started issuing PSFs nominating themselves as root sync station. Assuming that device 510*j* has a higher master preference value than any devices close to it (e.g., devices 510*a*, 510*h*), it would continue acting as a synchronization station even after they defer to other devices and cease issuing PSFs. Assuming further that the preference value of device 510*j* is lower than the preference values of devices 510*d* and 510*f*, the close devices (e.g., devices 510*a*, 510*h*) will synchronize with devices 510*d* and 510*f* rather than with device 510*j*. Thus, device 510*j* temporarily forms its own environment and hierarchy.

Now, if either or both of devices 510*a*, 510*h* become a stratum 1 master, they will start issuing PSFs that advertise the preference values of their root sync stations. Device 510*j* will hear those PSFs and realize that a hierarchy rooted at a "better" root sync station is within range, and will therefore synchronize with the device advertising the best root sync station (i.e., device 510*h* if it can hear both 510*h* and 510*a*).

This scenario demonstrates that a device (e.g., device 510*j*) may synchronize with, and become a leaf under, a peer having a lower master preference value (e.g., device 510*h*) if the device cannot directly hear the peer's master or if that master is beyond the range at which the device is currently listening. If the leaf device were configured to look further out (e.g., to a "far" range), it may synchronize directly to that far-range sync station, or to a different device altogether. Alternatively, while acting as the root sync station of its own one-node hierarchy, device 510*j* may start listening for a better far-range sync station and synchronize with device 510*f* directly.

In some embodiments of the invention, in addition to considering how many sync stations a device can currently hear, the ranges of those sync stations may also be considered when the device determines whether it should cease attempting to be a sync station. For example, and as discussed above, a peer device may stop issuing periodic synchronization frames and defer to close-range peers having better preference values if it hears a first threshold number of such peers (e.g., one). In these embodiments, a peer device may also stop issuing PSFs, even if no better close-range sync station is heard, if it hears a second threshold of far-range peer devices having better master preference values (e.g., three).

Figure 5B:
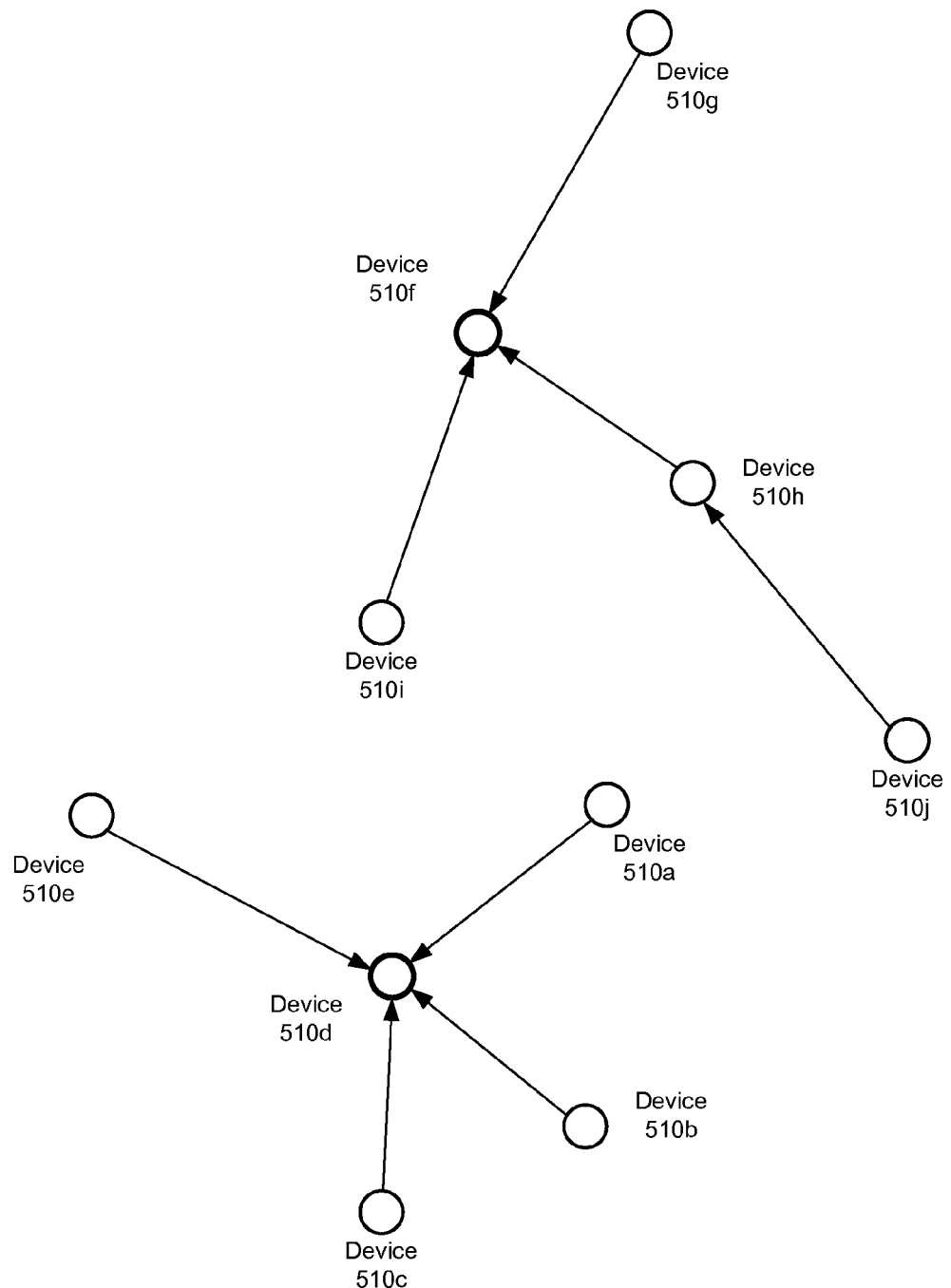

FIG. 5B is a diagram of the hierarchies that may result from the close-range synchronization and selection of master devices shown in FIG. 5A, according to some embodiments of the invention. Line segments represent synchronization, with arrowheads pointing to the synchronization station that is issuing PSFs and managing availability windows.

Although multiple devices may be acting as stratum 1 branch sync stations and sending PSFs, in FIG. 5B only one of them (device 510*h*) has actually extended its hierarchy beyond the range of its root sync station. The synchronization and organization of devices depicted in FIG. 5B may be settled on the order of one second or one availability window from the time all devices came online. The duration of time required for all peers to settle into appropriate roles and strata will differ from implementation to implementation, depending on the number of devices, the frequency and duration of the availability windows during which the master selection algorithm is executed, and/or other factors.

In some embodiments of the invention, a synchronization tree or hierarchy such as that shown in FIG. 5B is not intended to be used for routing purposes, but rather to synchronize devices within an area so that they may communicate directly, in peer-to-peer fashion.

After synchronization at close range, in the illustrated embodiment of the invention root sync stations (i.e., those at level 0—devices 510*f*, 510*d*) now look further out, to determine whether they should synchronize to a different sync station. For purposes of illustration, it may be assumed that "far" range is approximately twice the distance of close range.

In some other embodiments, all sync stations listen for devices at longer range; leaf devices remain focused on close range. If they have insufficient preference values to become sync stations within a close range, there is little reason to have them to expend the effort to determine whether they should be a longer-range sync station. In yet other embodiments, all devices may listen for devices at longer range.

Figure 5C:
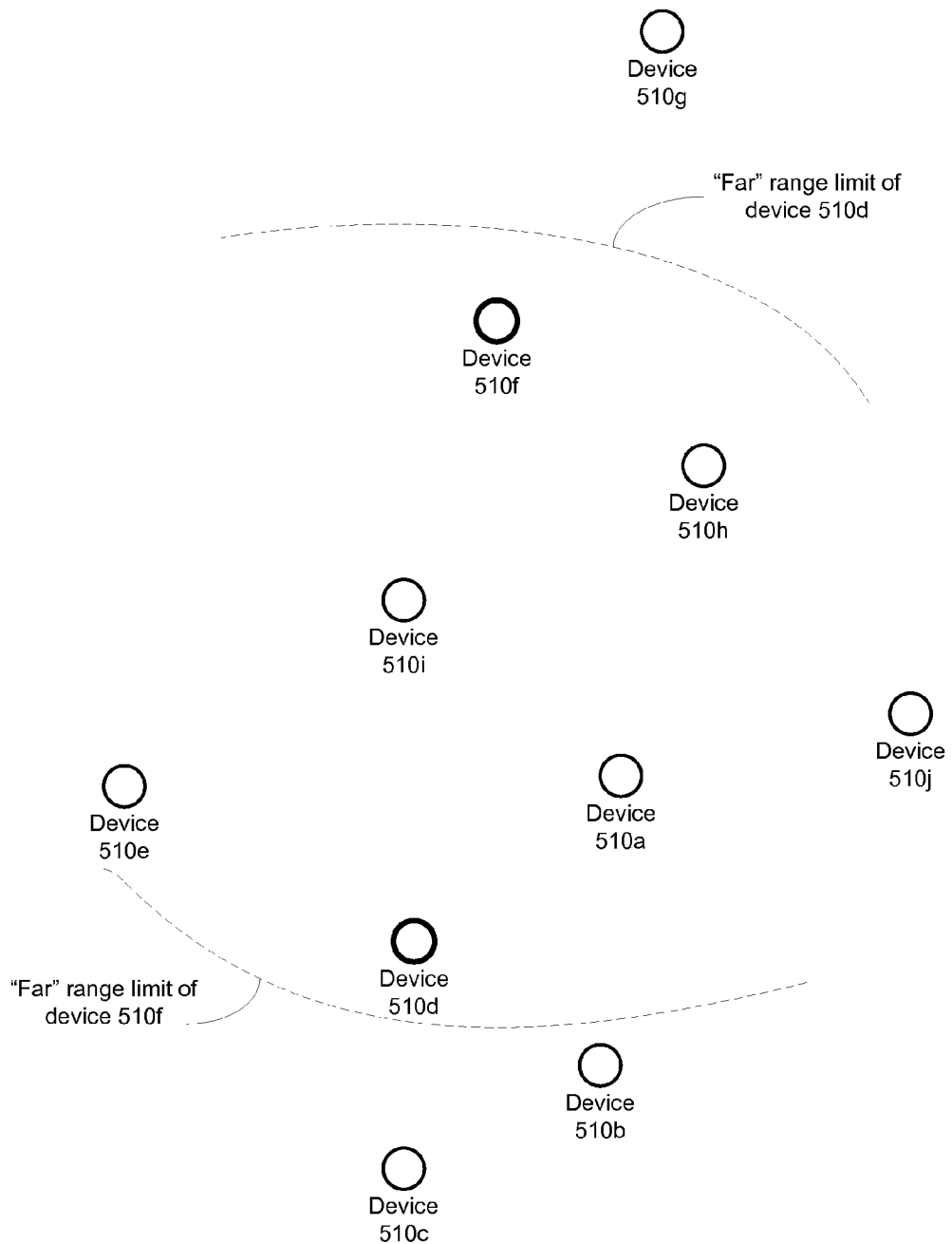

FIG. 5C shows the devices of FIG. 5A when far-range master selection and synchronization begins. Although complete range rings are not depicted in FIG. 5C, it may be assumed that the far range of device 510*f* encompasses all devices except devices 510*b*, 510*c*, and that the far range of device 510*d* includes all devices except device 510*g*. Therefore, all devices are within far range of at least one of the two top devices.

Root synchronization station 510*f* will continue issuing PSFs and advertising its sequence of availability windows unabated, because even at far range it doesn't hear any synchronization frames reporting a sync station having a higher master preference. Root synchronization station 510*d*, however, quickly learns that device 510*f* has a better master preference value. Device 510*d* may learn this directly from a PSF of device 510*f* or from a PSF issued by one of the devices 510*h*, 510*i* acting as stratum 1 branch sync stations under root sync station 510*f*.

However, because device 510*d* does not hear any device in range better suited to be a stratum 1 branch sync station, it starts issuing PSFs advertising the schedule of availability windows dictated by root sync station 510*f*, announcing its position in stratum 1, and reporting its own preference value and that of device 510*f*.

Other devices within close range of device 510*d* that may have been acting as stratum 1 branch synchronization stations would hear device 510*d* and stop issuing PSFs as level 1 branch sync stations, because device 510*d* has the second highest master preference value, exceeded only by root synchronization station 510*f*, and because the threshold number of better masters at which they must cease acting as master is one. In this illustrative environment, because the maximum depth of the hierarchy is two (i.e., strata 0 and 1), there will not be any masters at stratum 2.

Devices 510*a*, 510*b*, 510*c*, 510*e* will remain synchronized to device 510*d*, as leaf devices (none of them can be masters), but will adhere to the new availability window schedule promulgated by device 510*f* and now advertised by device 510*d*. In the illustrated embodiment of the invention, devices 510*a*, 510*b*, 510*c*, 510*e* do not listen for far-range devices, because none of them were root sync stations, and therefore they do not synchronize directly with device 510*f*. In other embodiments in which they do listen for the best far-range sync station, they may synchronize directly with device 510*f*.

Device 510*j* had been synchronized with device 510*h* acting as a level 1 branch sync station. Because device 510*h* does not listen for far-range devices (it was not a root sync station), it does not hear device 510*d*, and therefore it may still be the best level 1 branch sync station candidate within close-range of device 510*j*. If so, device 510*j* remains synchronized with device 510*h*.

This leaves device 510*g* as the only device that does not hear the threshold number of stratum 1 branch sync stations. Because it was not a root sync station, it is still only listening for close-range devices. It will therefore remained synchronized with device 510*f* and begin sending PSFs similar to those of device 510*d*, placing itself in stratum 1 and announcing its master preference value.

Figure 5D:
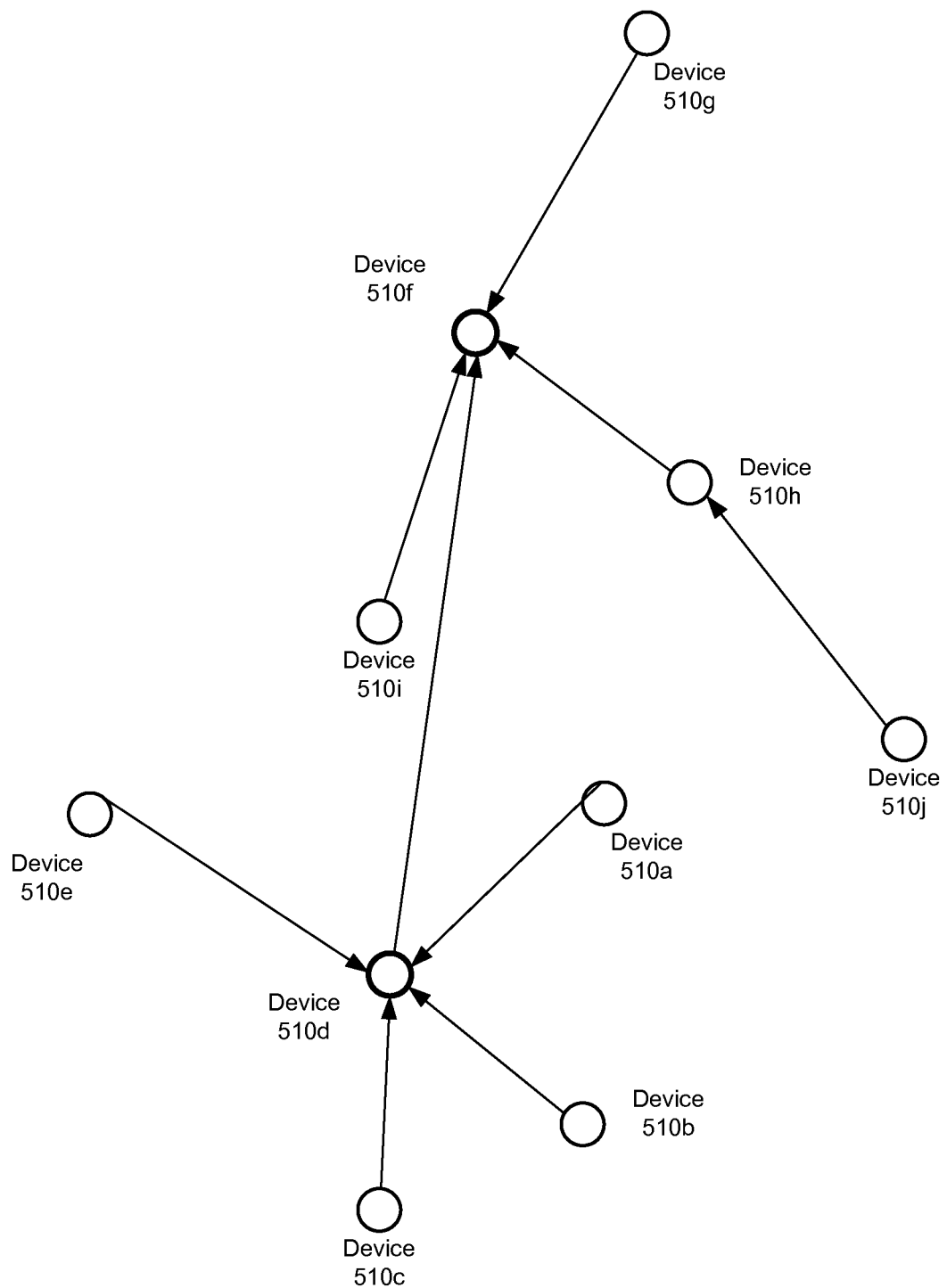

FIG. 5D depicts the hierarchy formed by merging the two separate hierarchies of FIG. 5B, according to some embodiments of the invention.

After an overall root sync station is selected, all synchronization stations in the same hierarchy advertise the same schedule and sequence of availability windows. Therefore, synchronizing to one master instead of another within the same hierarchy makes little difference. However, devices must comply with any applicable configuration parameters (e.g., maximum depth of hierarchy, maximum number of sync stations within a given range).

As shown in FIGS. 5A-D, in some embodiments of the invention peer devices first organize themselves into a close-range hierarchy. Shortly thereafter, these local clusters merge into a single, default, synchronized environment. In the illustrated embodiment, just close-range root synchronization stations looked (or listened) beyond close range, and so few devices needed to change from being synchronized with one device to being synchronized with another. In another embodiment in which more (or all) devices look further out, more devices would likely change synchronization from their local or close-range master to a far-range master.

When a root synchronization station at close range looks beyond close range, based on its master preference value it may change strata, or may remain at the same level. Branch synchronization stations under that root sync station may likewise change levels. For example, in an environment that provides for sufficient depth, if a close-range root sync station is demoted after it competes at longer range, its branch sync stations may automatically be demoted by the same number of levels in order to maintain the relative organization.

As one alternative to this, however, after the close-range root synchronization station's new stratum is determined, its branch sync stations may restart the selection process to settle the close-range hierarchy below the close-range sync station.

In some embodiments of the invention, a peer device cannot arbitrarily nominate itself (e.g., by issuing PSFs) to be a sync station at just any level of the hierarchy. When a device hears a sync station, regardless of that station's stratum S, and assuming that sync station has a higher master preference value than the device, the device can become a leaf under that device or, if it does not hear the threshold number of lower-level stratum S+1 branch sync stations, it may become a branch sync station at level S+1.

Figure 6:
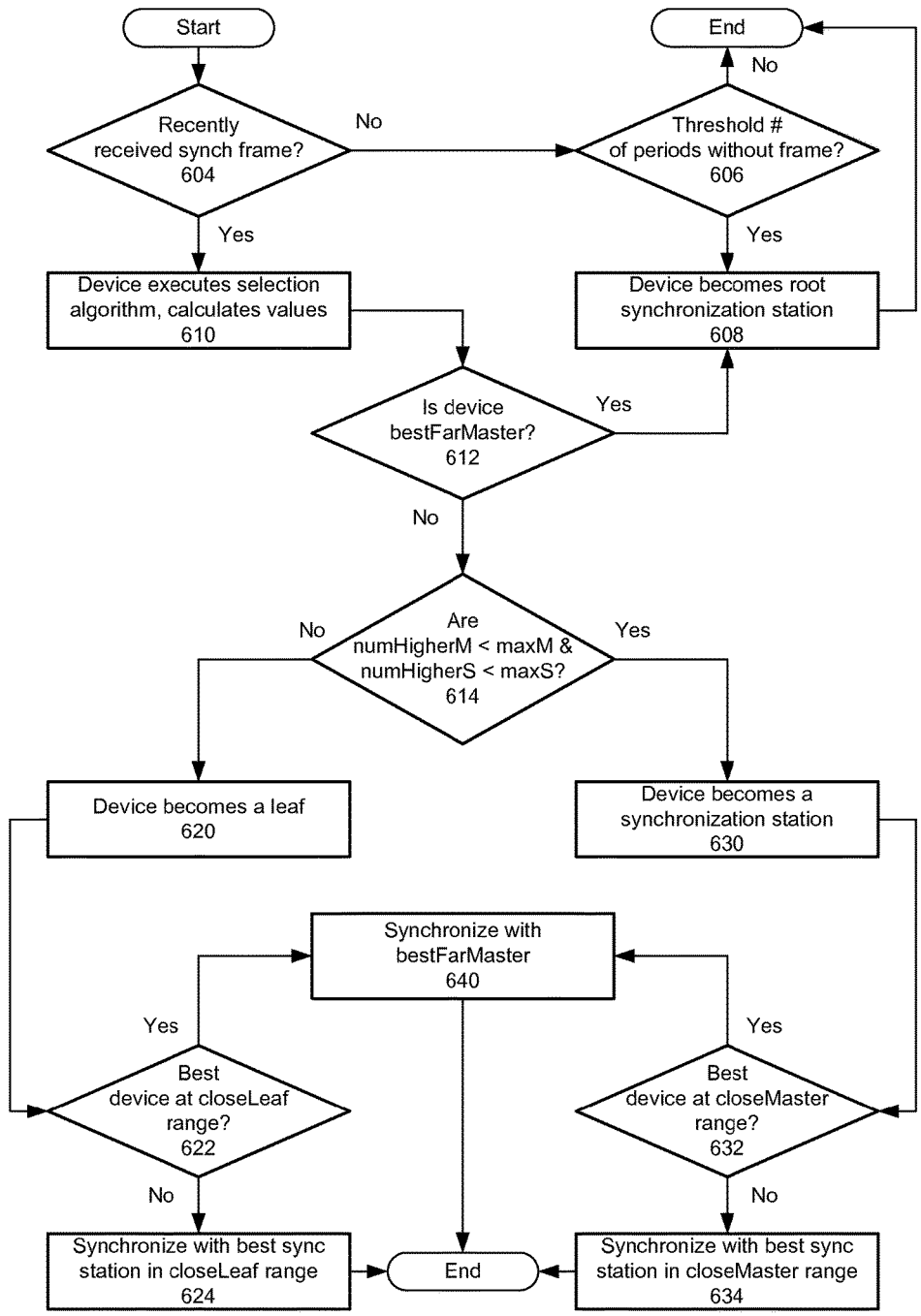
FIG. 6 is a flow chart demonstrating a method of selecting one or more synchronization stations in a peer-to-peer communication environment, according to some embodiments of the invention.

FIG. 6 is a flowchart demonstrating a method of selecting one or more synchronization stations in a default hierarchy within a peer-to-peer communication environment, according to some embodiments of the invention. The illustrated method may be executed before, during or after every availability window, after some subset of all availability windows (e.g., after the first or last window in the sync station's specified sequence), after some multiple of availability windows (e.g., after every two windows) or with some other regularity, and differs from the selection process depicted in FIGS. 5A-D. The process illustrated in FIG. 6 makes use of multiple ranges, which may or may not correspond to the close, mid and far ranges discussed above.

In embodiments of the invention reflected in the flow chart of FIG. 6, a leaf (or slave) device will synchronize with the best sync station that it hears with a signal strength greater than the signal strength corresponding to a range termed "closeLeaf." A branch sync station will synchronize with the best sync station that it hears within a "closeMaster" range, which corresponds to a different signal strength; this station may be the root sync station.

For comparison, closeMaster range is greater than closeLeaf range, meaning that the signal strength threshold associated with the closeLeaf range is higher than the signal strength threshold associated with the closeMaster range. This promotes local clustering of leaf devices, while a branch sync station is able to synchronize with a better branch sync station that is further away (or possibly the root sync station).

A "far" range may be used to denote the furthest distance at which any device will listen. Thus, while the "far" range is greater than both closeLeaf and closeMaster ranges, the corresponding signal strength is lower than the signal strengths corresponding to those ranges.

In the illustrated process, if the best peer device that a given device hears at closeLeaf range (if it is a leaf) or at closeMaster range (if it is a master) is that device itself, it will synchronize with the best master device it hears at far range. In some implementations, every device will keep track of the best sync station it hears at far range and at either closeLeaf or closeMaster range (whichever is appropriate), and will store (e.g., in memory) their synchronization parameters and master preference values.

Beyond the three ranges described above, which are used to identify which sync station a given device should synchronize with, other ranges may be used to help determine the given device's role as a synchronization station (or master) or as a leaf, or whether it should continue competing to be a sync station. For example, a device may track the number of sync stations that it hears within two ranges, termed shortRange and midRange.

In an illustrative implementation, shortRange may be approximately one meter, closeLeaf and closeMaster ranges may be on the order of four and five meters, midRange may be between five and ten meters, and far range may be approximately thirty meters. In other embodiments of the invention, a master selection process may consider fewer or additional ranges, which may extend virtually any distances and which may correspond to varying signal strengths.

Thus, one set of ranges (e.g., closeLeaf, closeMaster, midLeaf, midMaster, far) may be used to determine what master device a given device will synchronize with. A different set of ranges (e.g., shortRange, midRange) may be used to identify the device's role.

In operation 604, a device determines whether it has recently received a synchronization frame (e.g., a PSF, an MIF) from the sync station with which it is synchronized. If one has been received within the last PSF period, or within some other applicable time period (e.g., an availability window period), the method advances to operation 610; otherwise, the method continues at operation 606.

In operation 606, the device determines whether a threshold number of availability windows or availability window time periods (or other applicable time periods) have passed without receiving a synchronization frame. If so, the method continues at operation 608; otherwise, the device maintains its current state and current synchronization and exits the illustrated method without executing the master selection process. Although no significant corrective action need be taken (because the number of missed PSFs has not hit the threshold), the device has not recently synchronized and may not have current master preference values to use to select a sync station.

In operation 608, the device becomes root synchronization station of the peer devices' hierarchy, but may maintain the previous root sync station's sequence or schedule of availability windows and PSF periodicity unless they conflict with other operation of the device. A goal when any sync station is replaced, including the root, is to maintain synchronization within the environment; therefore, the preference is to continue with the same synchronization parameters if possible. After operation 608, the master selection process ends for the device.

In operation 610, the device begins executing the applicable master selection algorithm, using preference values (or selection metrics) that it has received via synchronization frames (e.g., PSFs, MIFs) and/or heard from other devices (e.g., sync stations to which it is not currently synchronized) or that have been relayed by other devices. In particular, the device will compare its master preference value to those of other devices.

As described above, synchronization stations may be examined at different ranges. In these embodiments, the RSSI (Received Signal Strength Indication) of synchronization frames received from sync station candidates, or some other measurement of the strength of other devices' signals, such as RCPI (Received Channel Power Indicator), may be used to determine their range.

As part of operation 610, the device calculates several values relative to the device executing the method of FIG. 6, including the following (the ranges are described above):

| | |
|---|---|
| bestFarMaster | Identity (e.g., address) of best sync station within far range |
| bestCloseLeaf | Identity (e.g., address) of best sync station within closeLeaf range |
| bestCloseMaster | Identity (e.g., address) of best sync station within closeMaster range |
| numHigherM | Number of sync stations within midRange that have higher master preference values |
| numHigherS | Number of sync stations within shortRange that have higher master preference values |

In comparing master preference values, in some embodiments of the invention a device will compare itself to each of one or more other devices it can hear, and rank itself in comparison to them, using the following rules.

Rule 1: If the device is the root sync station and the other device is in the root's tree (or vice versa), or if the device is a leaf and the other device is the device's current synchronization station (or vice versa), then their master preference values are compared. The device with the higher preference value wins and is ranked higher; if equal, their MAC addresses are compared and the higher (or lower) MAC address wins.

Rule 2: If Rule 1 does not apply and neither device is the root synchronization station, but they are in the same tree, the comparison depends on their strata. If they are in different strata, the device in the lower-numbered stratum (i.e., closer to the root) wins. If they are in the same stratum, the device with higher master preference value wins; if equal, their MAC addresses are compared.

Rule 3: If the devices are in different hierarchies (i.e., they do not have the same root sync station), the master preference values of their root sync stations are compared. The device whose root sync station has a higher preference value wins; if equal, their MAC addresses or the MAC addresses of their root sync stations are compared.

Rules 1 and 2 promote stability of the synchronization hierarchy while generally establishing the shortest path from a given device to the root synchronization station of the hierarchy. Rule 3 ensures that two separate hierarchies in proximity to each other have the opportunity to merge into a single hierarchy.

While conducting operation 610, the device implementing the illustrated method considers default and group identifiers advertised by other devices, and may ignore devices that advertise a default identifier different from its own. As introduced above, a default identifier identifies a larger hierarchy of peer devices, while a group identifier identifies a smaller hierarchy of peers.

As described in a following section, the device performing a procedure for identifying or selecting synchronization stations may also ignore devices that advertise a different group identifier, unless the device is the root sync station of its private group. More specifically, members of a group may normally execute a selection process similar to that of FIG. 6, but only to consider devices belonging to the group, while the group root sync station may afterward perform the illustrated method to synchronize with a default hierarchy.

In operation 612, the device determines whether it is bestFarMaster (i.e., has the highest master preference among all devices within far range of the device). If so, the method returns to operation 608; otherwise, the method proceeds to operation 614.

In operation 614, the device determines whether numHigherM (i.e., the number of sync stations within midRange that have higher master preference) is less than a threshold or maximum number of midRange sync stations (maxM), and whether numHigherS (i.e., the number of sync stations within shortRange that have higher master preference) is less than a threshold or maximum number of shortRange sync stations (maxS). If so, the method advances to operation 630; otherwise, the method continues at operation 620.

In some embodiments of the invention, the method may advance to operation 630 from operation 614 if either numHigherM is less than maxM or numHigherS<maxS (i.e., an "or" operation is performed instead of an "and" operation).

In operation 620, the device appoints itself as a leaf, because even if it has a higher master preference value than some other devices, a threshold number of sync stations within shortRange that have higher values are already in position. If the device had been issuing periodic synchronization frames, it ceases.

In operation 622, the device determines whether it is the best device within closeLeaf range (i.e., the best candidate within closeLeaf range). If so, the method advances to operation 640; otherwise, it continues at operation 624.

In operation 624, the device synchronizes with bestCloseLeaf (i.e., the sync station within closeLeaf range that has the highest master preference value). The method then ends.

In operation 630, the device assumes the role of a synchronization station. This will require it to issue periodic synchronization frames and manage a sequence of availability windows to synchronize other peer devices.

In operation 632, the device determines whether it is the best device at closeMaster range (i.e., the device within closeMaster range with the highest master preference value). If so, the method advances to operation 640; otherwise, it continues at operation 634.

In operation 634, the device synchronizes with bestCloseMaster (i.e., the best sync station within closeMaster range). The method then ends.

In operation 640, the device synchronizes with bestFarMaster (i.e., the within far range with the highest master preference value), which may be the root sync station. The method then ends.

FIGS. 7A-E depict execution of the master selection process of FIG. 6 according to some embodiments of the invention.

Figure 7A:
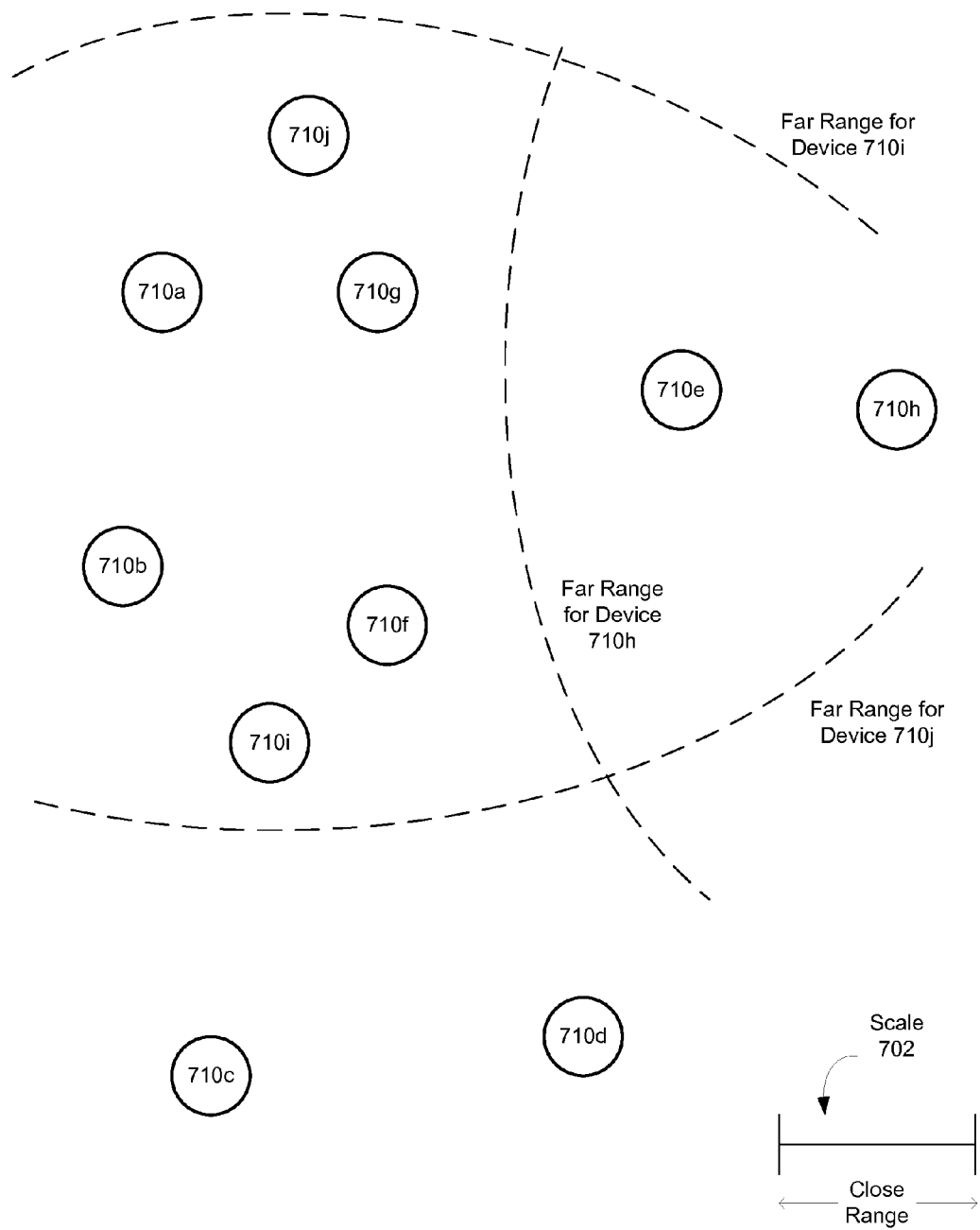
FIGS. 7A-E depict execution of the method illustrated in FIG. 6, according to some embodiments of the invention.

FIG. 7A illustrates a collection of peer devices distributed within an environment. Device labels indicate the devices' rankings in reverse order of their master preference values (and their MAC addresses if two devices' metrics tied), wherein device 710a<device 710b<device 710c< . . . <device 710i<device 710j. Thus, of all the devices in the environment, device 710j has the highest master preference value and is considered the "best" device in the environment.

As discussed above, multiple different ranges are relevant to the selection of sync stations and synchronization of the devices. Limits of "far" ranges for the top three devices (devices 710h, 710i, 710j) are shown in FIGS. 7A-E, along with scale 702 demonstrating an illustrative "close" range. In the illustrated embodiment, closeLeaf and closeMaster ranges (as described above with regard to FIG. 6) are equal and match the close range represented by scale 702.

Figure 7B:
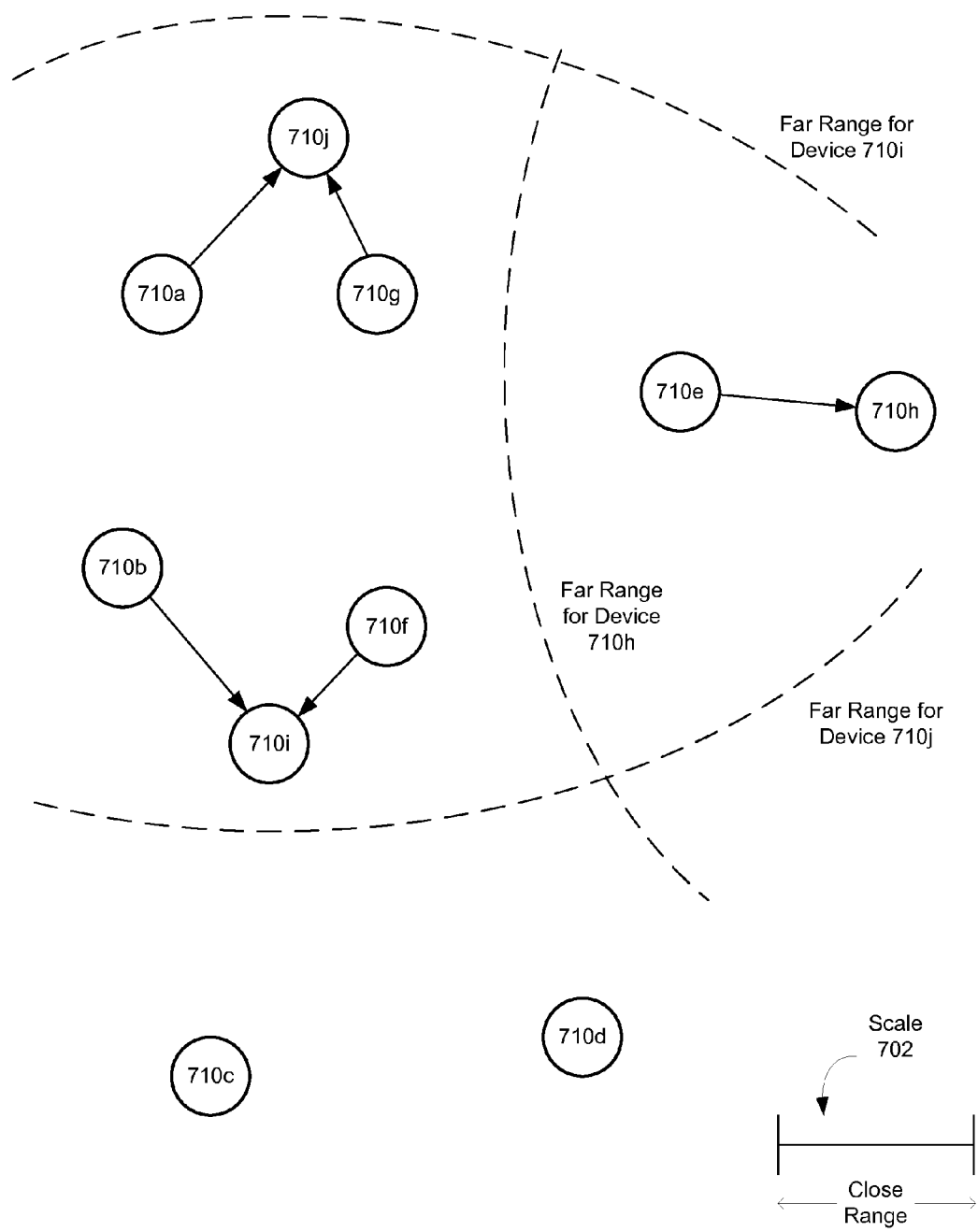

FIG. 7B illustrates the close-range connections that are established when each device synchronizes with the closest sync station it can hear (e.g., in operation 634). In the illustrated scenario, most devices are within close range of one of the top three devices, and therefore synchronize with one of those devices. Devices 710c, 710d, however, find no other devices within close range, and therefore continue unsynchronized for now (i.e., in their own one-device hierarchies).

It may be noted that some devices (e.g., devices 710b, 710e, 710f) can hear better sync stations than those they initially synchronize with, but are only looking for the closest sync station, not the best that they can hear. Also, all devices may still be sending synchronization frames, because no device has yet found reason to become a leaf.

Figure 7C:
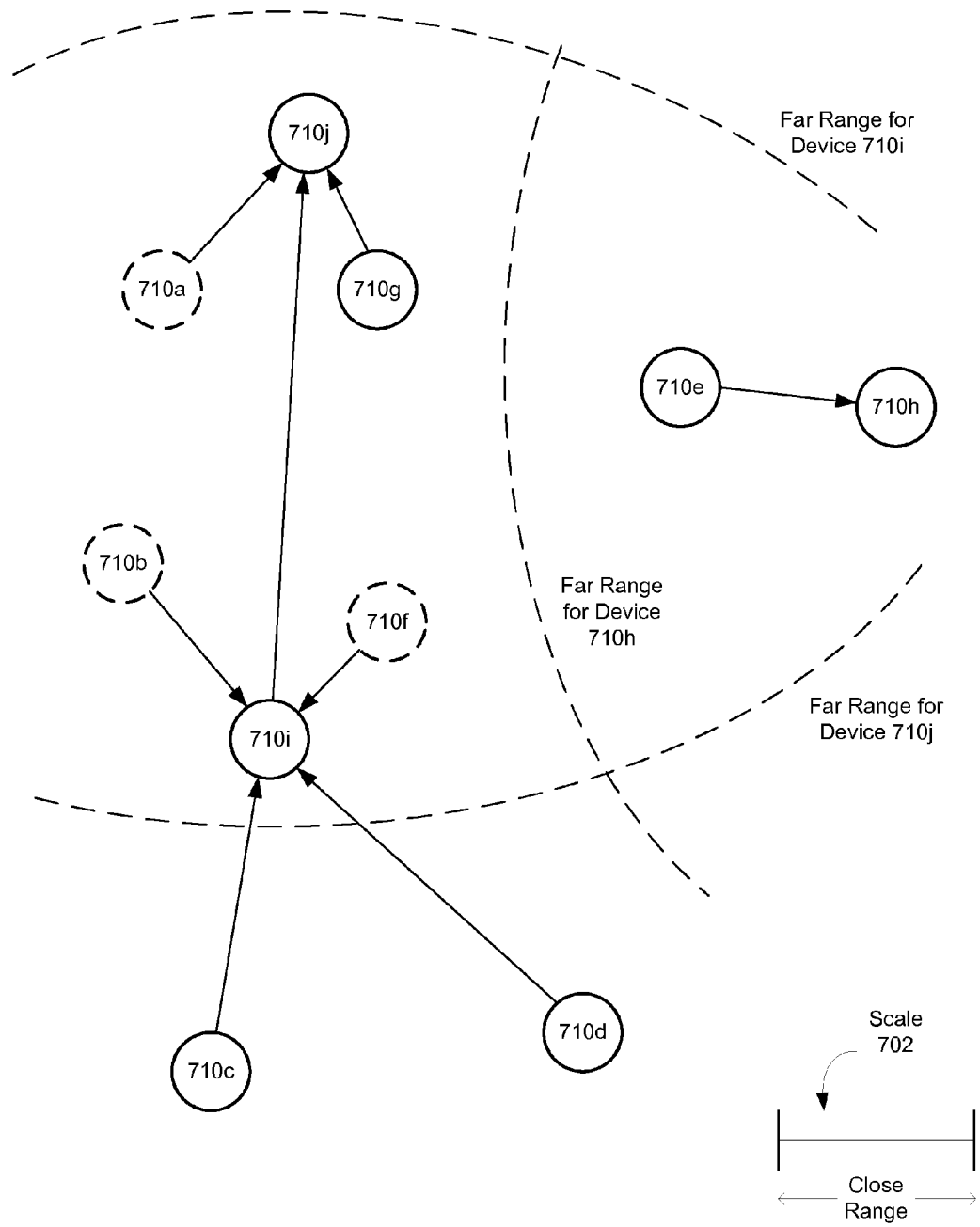

FIG. 7C depicts the environment as sync stations listen for and connect to better synchronization stations at far range. For example, and according to the method illustrated in FIG. 6, devices 710c, 710d, 710i became sync stations at operation 630, discovered they were the best sync stations within close range in operation 632, and then implemented operation 640, wherein they synchronized with the best sync station within far range. Thus, device 710i synchronizes with device 710j and devices 710c, 710d synchronize with device 710i.

Also, some devices now transition to leaf status because they hear threshold numbers of synchronization stations having better selection preference values at short and/or mid-range. For example, and following the method depicted in FIG. 6, devices 710a, 710b (and/or others) reach operation 614 and determine how many masters they hear at short range and at mid-range. One or both of these values equal to or exceed their thresholds, and so the devices implement operations 620, 622 and 624 to become leaves synchronized to the best sync station within closeLeaf range. Illustratively, both short range and mid-range are longer distances than close range, but less than far range.

The dashed outlines of devices 710a, 710b and 710f indicate that they are now leaf devices. As leaves, they cease issuing periodic synchronization frames.

Also with reference to FIG. 7C, non-leaf devices commence or continue issuing synchronization frames advertising their master preference values and the preference values of their root sync stations. For example, device 710e will advertise preference values of devices 710e and 710h, and device 710g will advertise preference values of devices 710g and 710j.

Figure 7D:
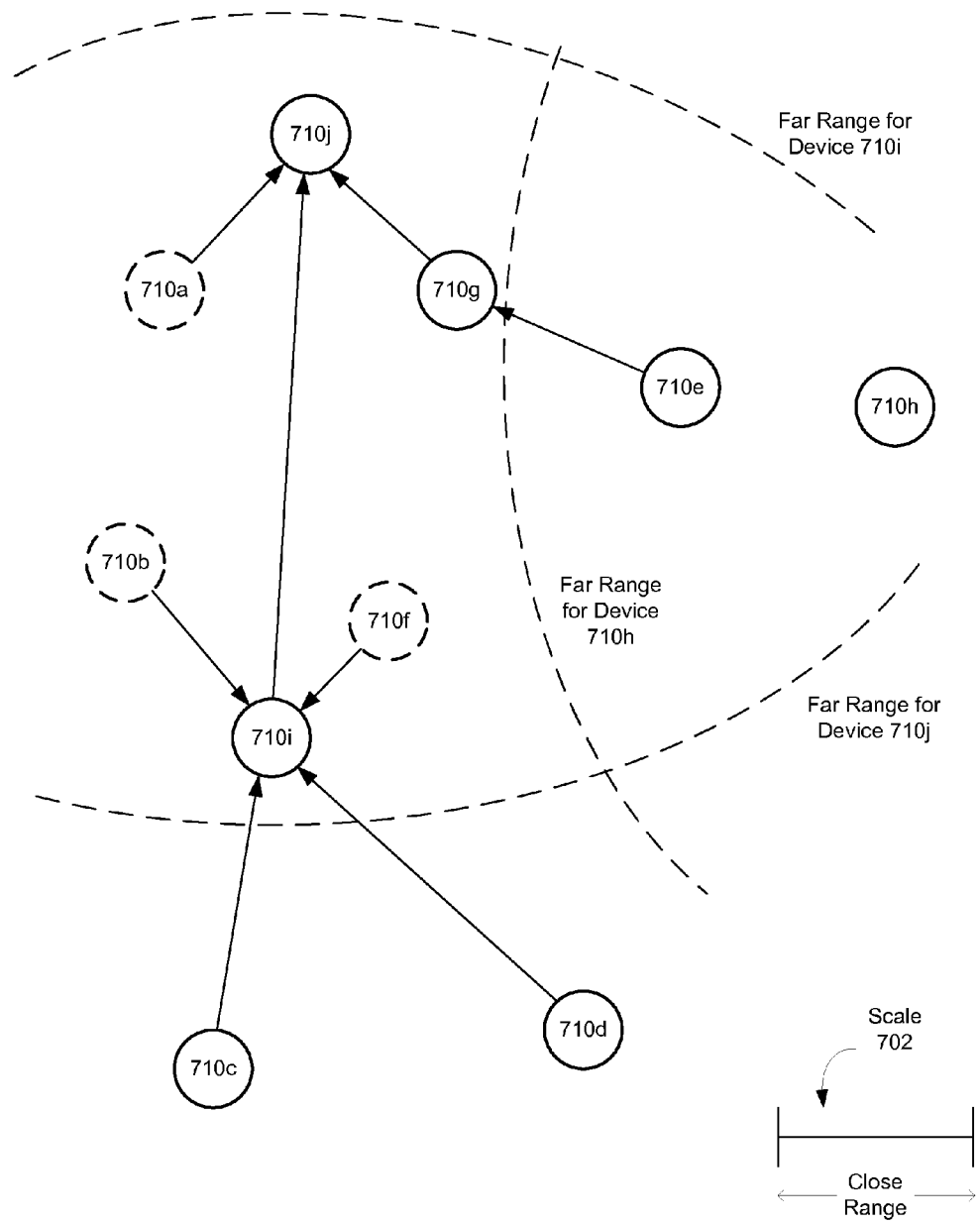

FIG. 7D depicts the environment after device 710g is physically moved closer to device 710e, but still beyond the far range of device 710h. In particular, device 710g moves within close range of device 710e.

Via its synchronization frames, device 710g advertises its master preference value and the preference value of device 710j. When device 710e compares these values as part of the master selection process, it will note a preference for device 710j over device 710h. Therefore, device 710e will now synchronize with device 710g.

Figure 7E:
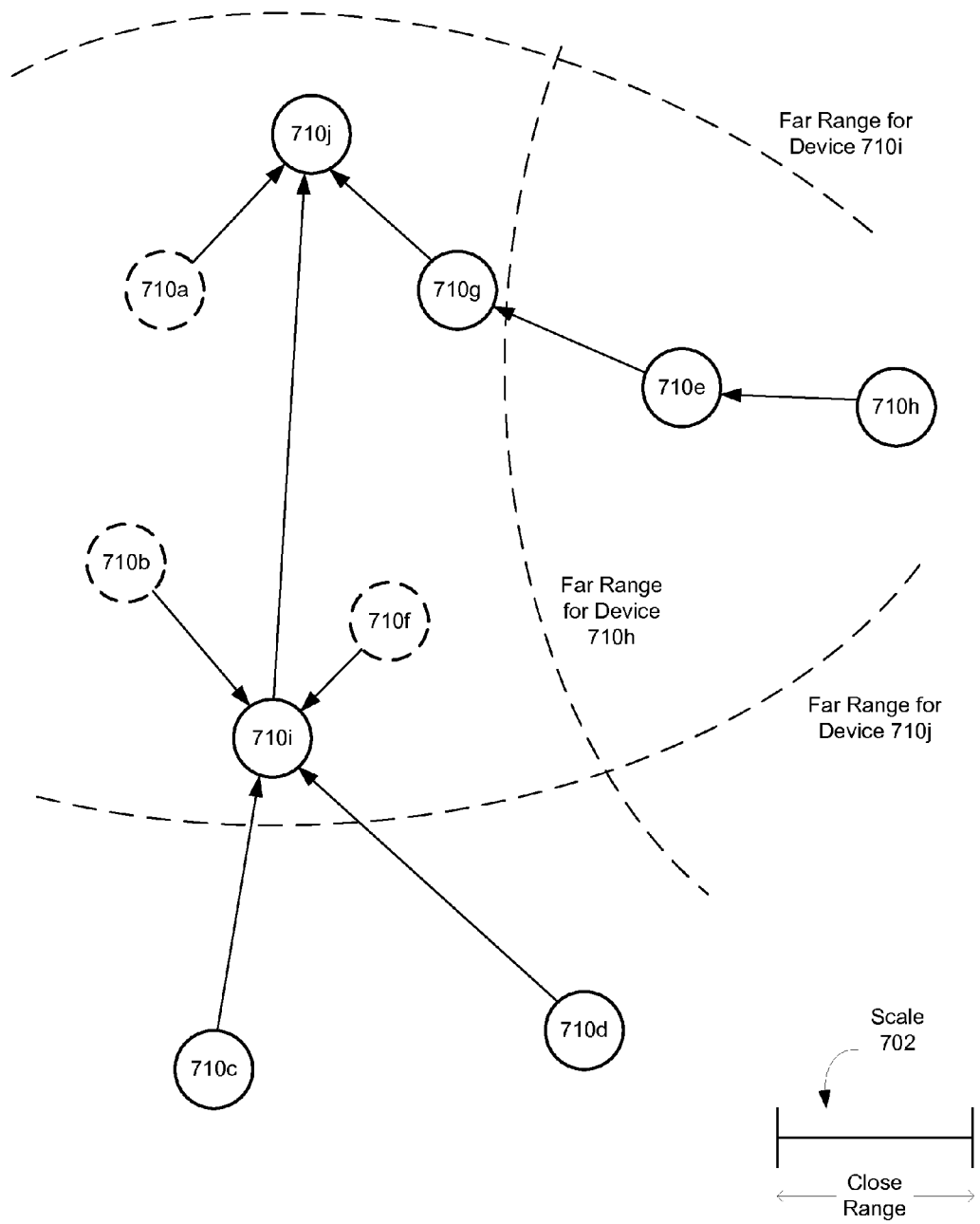

In FIG. 7E, device 710e has begun issuing synchronization frames advertising its preference value and that of its new root sync station, device 710j. Device 710h will compare the master preference value of device 710j to its own, and see that device 710j is the preferred root.

Device 710h may therefore synchronize with the extended hierarchy of device 710j if, as shown in FIG. 7E, the maximum depth parameter of the hierarchy permits. If device 710e was at the maximum depth of the hierarchy, then device 710h could synchronize with device 710e but could only act as a leaf. If device 710g had been at the maximum depth, device 710e could only have been a leaf, and device 710h could begin its own hierarchy if no other peers are in range.

In some embodiments of the invention, a master selection algorithm or process is continuous. In these embodiments, the process restarts or repeats with every availability window, and may therefore take some time before all devices are placed at their "correct" level in the hierarchy. As devices move into, within and out of the environment, the hierarchy may continually change.

However, it should be noted that synchronization of devices happens much more quickly and will not be degraded by the ongoing master selection process. That is, synchronization does not depend on having every device in its correct logical position.

In particular, even though the devices acting as the root synchronization station and branch synchronization stations of a hierarchy may change over time, this will not interrupt synchronization in most implementations. In these implementations, the same availability window schedule is applied throughout the hierarchy; therefore, any device newly assuming the role of root sync station (or the role of a branch sync station) will already be synchronized with the other devices and they will be synchronized with it.

In some embodiments of the invention, the selection metrics used to compute a device's master preference value include its transmission range and power level. As a simple example, a device with higher transmission power or range will have preference to be a synchronization station over all devices having less transmission power/range. As the device's power reserves diminish, its preference value will likewise decrease. In other embodiments, other metrics may be considered.

In these embodiments, if transmission powers/ranges are not available (or if there is a tie between devices), the device having the highest remaining battery charge will have the higher preference value. If both transmission range and battery charge are unknown (or tie), devices' MAC addresses (or other addresses/identifiers) may be compared.

Because selection of masters or synchronization stations is a continuous or regular process in these embodiments, the cost of being a sync station (e.g., power usage) is shared among different peers. As one station's power level decreases (e.g., because of regularly issuing periodic synchronization frames), another device will take its place.

In other embodiments, other metrics may be considered. As described previously, these master selection metrics, and/or a simple master preference value representing a combination of the metrics, are advertised by devices when they broadcast synchronization frames.

Private Groups

In some embodiments of the invention, two or more members of a default hierarchy (or of different default hierarchies) may form a group to engage in a file transfer, play a game or conduct some other activity. By organizing as a group, members may benefit from higher bandwidth, lower latency, less contention and/or other advantages of cooperation. For example, two (or more) devices may create a private group to conduct an enhanced data rate session to exchange data.

As described in a previous section, within the synchronization frames it broadcasts (e.g., PSFs, MIFs), a device may advertise multiple identifiers—such as a "default" identifier of the hierarchy to which the device is or was synchronized and a "group" identifier of a group the device belongs to. In some embodiments of the invention, all hierarchies adopt the same default identifier, such as 0, to reflect normal peer-to-peer operations. A device that is in proximity to multiple default hierarchies may simply join that which advertises a better root synchronization station or top master. Therefore, using the same default identifier among different hierarchies does not cause conflicts.

In some implementations of this embodiment of the invention, a non-zero default identifier is advertised by a device that cannot or does not maintain synchronization with a typical default hierarchy. A master that must maintain alignment with an infrastructure beacon (e.g., an access point) is one example of a device that advertises a non-zero default identifier.

The non-zero default identifier for such a master may be derived from a BSSID (Basic Service Set Identifier) of the infrastructure beacon, through execution of a predetermined algorithm. A master synchronized with an infrastructure beacon may or may not belong to a group, and may only be able to synchronize with other devices aligned with the same beacon.

A group identifier of 0, or the absence of a group identifier, may identify a device that is not participating in any group. Values greater than zero may be reserved for use by active groups. In different implementations, a group identifier may have different magnitudes (e.g., 16 bits, 32 bits).

In embodiments of the invention, the specific value adopted as a group identifier is selected, possibly randomly, by the application or service that will be commonly executed among the group's members (e.g., AirPrint™, an App Game Kit™ application, a file-sharing utility), or a higher-level protocol layer that supports the application. The application identifies members of the group to lower-level protocol layers (e.g., by MAC address or other identifier), and distributes the group identifier among the members.

In some embodiments of the invention, a default and group identifier duple of "0/%" serves to identify an idle device, which may be defined as a device that is synchronized within a default hierarchy but not active within a group, and therefore is not engaged in an active data session. An idle device will simply operate discovery protocols, other addressing and routing protocols, etc. If and when two or more devices elect to cooperate in some manner (e.g., by sharing data or an application), they will create or join a group.

Devices belonging to the same group will synchronize among themselves to form a group hierarchy, similar to the manner described above for synchronizing an entire default hierarchy. The devices will remain synchronized with each other as long as they remain in the group.

Depending on the number of devices within a group, and any other applicable parameters, some members of the group may be branch synchronization stations under the group root sync station (i.e., the root sync station of the group, also known as the top group master), with all other members being leaves (or slaves). Group members may continue to execute a process for selecting or identifying masters or synchronization stations, but their membership in a group will adjust the process such that they only consider selecting group members as sync stations, and thereby establish a group hierarchy. The selected group root sync station will straddle the boundary between the group and a default hierarchy and, as indicated, attempt to synchronize with the default hierarchy. Thus, regardless of whether or not it is active in a group hierarchy, a device normally will have only one master to/with which it synchronizes.

In some embodiments of the invention, for synchronization purposes each member of a group considers rules such as the following, in sequence, until finding and applying one that specifies how (e.g., to whom) it should synchronize. Similar to parameters described above for a default hierarchy (e.g., maximum number of sync stations, numbers of sync stations within particular ranges), a group member may consider various factors or parameters in determining whether it should act as a synchronization station.

Rule 1: A group device synchronizes with the best device within close range (other than itself) that is a member of the same group (i.e., that advertises the same group identifier). That device will be either the group root synchronization station or a group branch sync station.

Rule 2: If the device is the best device at close range that is a member of the group, then it synchronizes with the best device within far range (other than itself) that is a member of the group.

Rule 3: If the device is the best device within far range that is a member of the group, it assumes the role of group root synchronization station and synchronizes with the best sync station at close range (other than itself) that advertises the same default identifier (e.g., 0), and is therefore part of the same default hierarchy, and either no group identifier or a different group identifier. In some implementations, however, a group root synchronization station will not synchronize with a sync station that is active in a different group.

Rule 4: If the device is the group root synchronization station and the best sync station at close range within a default hierarchy, it will synchronize with the best sync station at far range that is a member of the same default hierarchy.

Rule 5: If the device is the group root synchronization station and the best sync station at far range within a default hierarchy, then it is the root synchronization station of both the group and default hierarchies and does not synchronize to any other device. It will maintain the synchronization parameters under which it was operating before applying these rules, and advertise them in any synchronization frames it issues.

Synchronization parameters advertised within a group hierarchy may be similar or identical to those of a default hierarchy. In particular, availability windows may be scheduled for the same times, with the same durations, on the same or different communication channels.

This synchronization of availability window schedules may occur naturally, because the members of the group may have been drawn from the same default hierarchy, and hence were already synchronized under a common set of synchronization parameters. Further, when the root sync station of a group is synchronized to a default hierarchy, it will derive its group synchronization parameters from the sync station to which it is synchronized, which will be those of the default hierarchy.

However, the group root synchronization station's published schedule of availability windows may be configured to avoid congested communication channels, may use channels in the 5 GHz band (if all member devices are capable of using that band), may adjust its availability window parameters (e.g., length, period) if necessary to avoid interfering with the application or service shared by the member devices, and/or consider other factors. Thus, in different environments or different implementations, a group's synchronization parameters may be identical to those of an adjacent default hierarchy or may differ to any degree.

When a group disbands, members may initially remain synchronized to the group synchronization stations with which they had been synchronized. Each group sync station is either synchronized directly to a hierarchy (in the case of the group root sync station) or is synchronized with the group root sync station. Because the group root sync station is synchronized with a hierarchy, it advertises synchronization parameters of that hierarchy's root synchronization station. By being synchronized with the group root sync station, the group members may therefore already be synchronized with the hierarchy. As the members leave the group and resume execution of a master selection algorithm, they will again consider all masters in the default hierarchy for possible synchronization, instead of just group sync stations.

In some embodiments of the invention, the first device that opens an application for group operation sets a private identifier and begins advertising the group (e.g., via periodic synchronization frames and/or master indication frames). The nature or purpose of the group may be identified in the same communications as the private identifier, may be determined via a discovery or service protocol, or may be learned in some other way.

Although a slave or leaf device is normally silent within a hierarchy (i.e., does not issue synchronization frames), it may advertise a private group within master indication frames that it broadcasts during availability windows. This advertisement may be conveyed via a particular application-level protocol that supports networked or multi-user social applications, such as App Game Kit™ by The Game Creators, or some other gaming or content-sharing application. As other devices contact the first device, the application receives and accepts their requests to join.

A device joins the group by setting its private identifier to match that of the group and by synchronizing with a group synchronization station. Thereafter, it attends availability windows advertised by the group master with which it is synchronized.

Figure 9A:
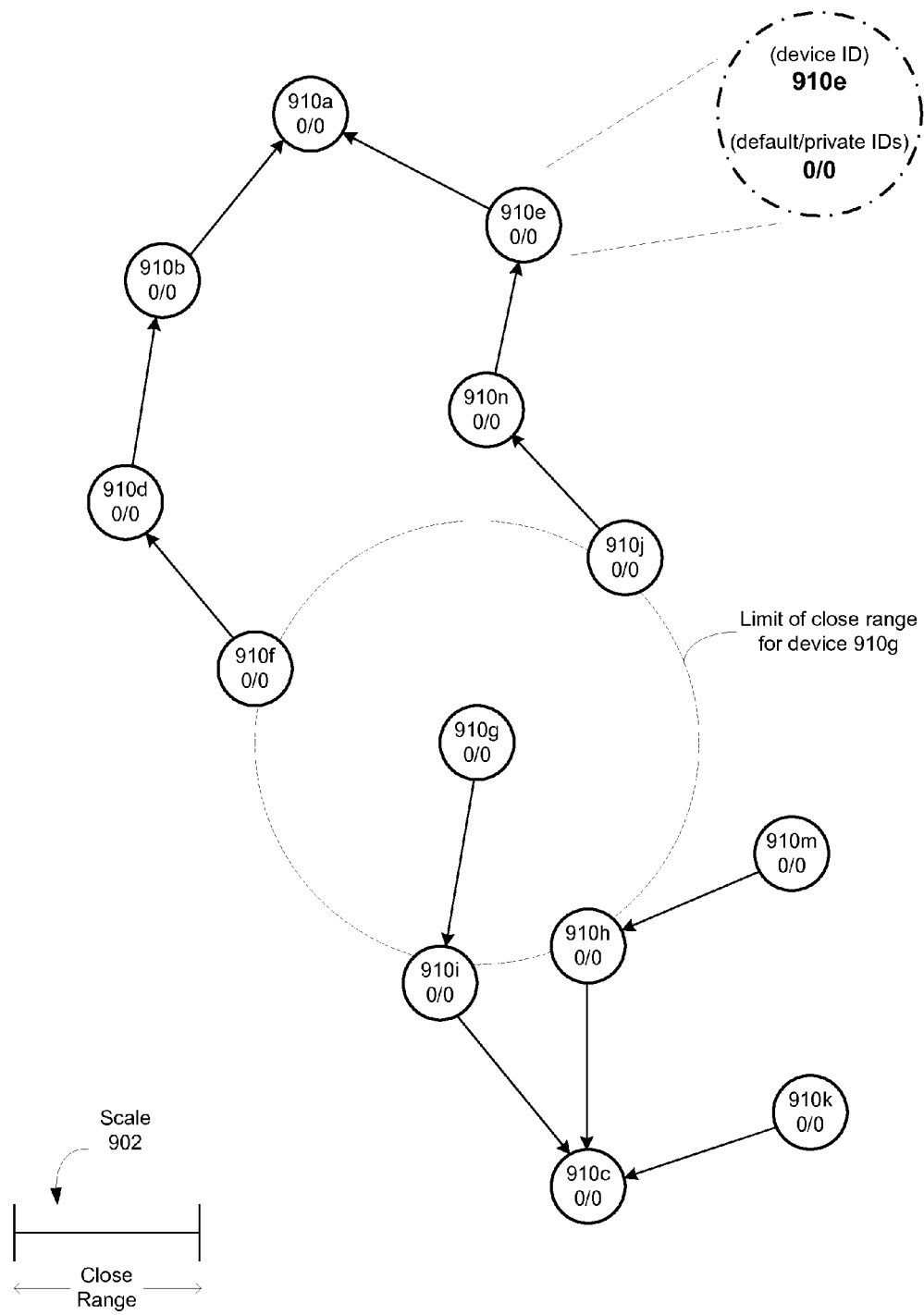
FIGS. 9A-B depict the creation of a group within a hierarchical collection of communication devices within a peer-to-peer environment, according to some embodiments of the invention.
Figure 9B:
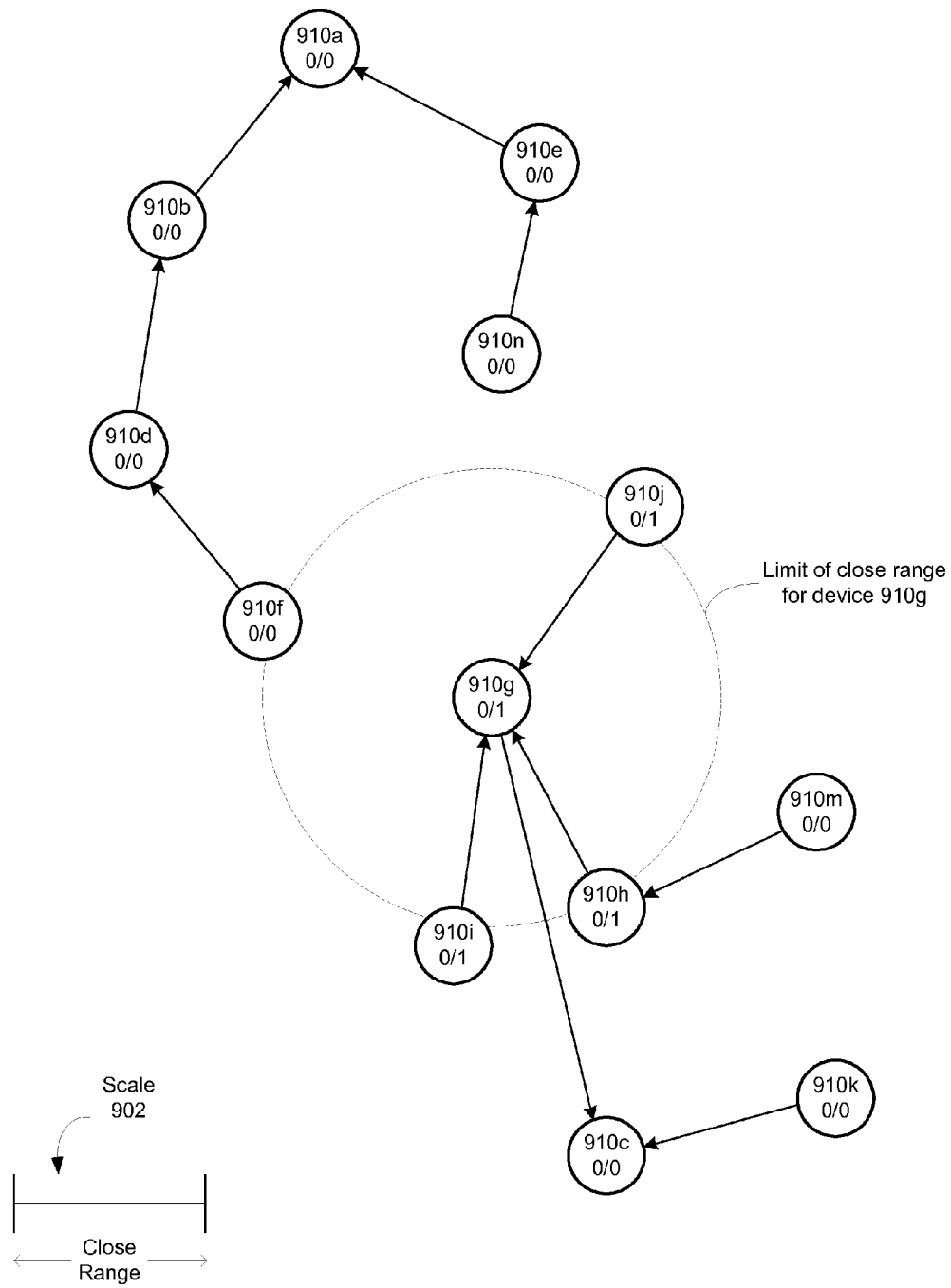

FIGS. 9A-B depict the creation of a private group within a hierarchically organized environment of peer devices, according to some embodiments of the invention.

In these figures, devices 910a-910m are labeled in order of their master preference values, such that device 910a>device 910b>device 910c> . . . >device 910m. A representation of an illustrative device 910e is magnified; as shown in the magnification, the duple below a device's label identifies the device's default and group identifiers in the form x/y, wherein x is the default identifier and y is the group identifier. Scale 902 depicts the distance that equates to close range in the environment.

In FIG. 9A, a collection of peer devices is organized into two hierarchies, one rooted at device 910a and the other rooted at device 910c. All devices are currently idle, as indicated by their default and group identifier duples of 0/0.

It may be noted that device 910g, for which the limits of close range are shown, has synchronized with the tree that is rooted at 910c instead of the tree rooted at device 910a even though it is within close range of devices 910f, 910j, either or both of which would advertise master preference values (regarding device 910a) that are higher than those advertised by device 910i (regarding device 910c).

This may occur if, for example, neither of devices 910f and 910j can act as synchronization stations, perhaps because of the maximum hierarchy depth specified by the protocol being implemented. In this implementation, the maximum depth of the hierarchy refers to the maximum number of hops between the root synchronization station and the furthest leaf device. Therefore, with a maximum depth of 3, there could be at most 3 levels of master devices (one root synchronization station at stratum 0 and branch synchronization stations at strata 1 and 2) followed by one layer of leaf devices. In other words, the maximum depth of the hierarchy may identify the maximum number of strata or levels in which synchronization stations may be found, and leaf devices may be found in those strata (except root strata zero) and one additional stratum.

In the environment of FIG. 9A, if devices 910g, 910h, 910i and 910j choose to exchange data (e.g., to play a game or to share a document), they will implement a different group identifier, for example 1. Using applicable rules and a suitable selection process (e.g., a process described in a previous section), these devices will select device 910g as the group's root synchronization station because it has the best master preference value among the devices.

In an illustrative implementation, creation of the group commences when a first device opens a gaming application that has a multi-player aspect. The game may use the Bonjour® protocol or other means to advertise availability of the game instance, along with the group identifier. Other potential players' devices are thus notified that they should change their group identifiers accordingly if they want to join.

FIG. 9B depicts the environment and devices of FIG. 9A after the private group has adopted a group identifier of 1 and synchronized among themselves. Devices 910h, 910i and 910j have synchronized with their group root sync station, device 910g (e.g., as required by Rule 1 (or 2) above), and device 910g has synchronized with device 910c as the best default hierarchy master device within far range (e.g., as required by Rule 4 above).

Device 910g will issue regular synchronization frames (e.g., PSFs) to keep group members synchronized, and will also attend availability windows advertised by device 910c, to retain synchronization with device 910c's hierarchy. By scheduling one or more of its availability windows to match the schedule advertised by device 910c, device 910g can also bring devices 910h and 910i into synchronization with the hierarchy rooted at device 910c.

In the environment of FIG. 9B, device 910m may remain synchronized with device 910h while group 1 is active, because device 910h is the best master device within close range that has the same default identifier. When the private group disbands, the individual devices of the group will resume normal execution of their master selection algorithms and, if the peer devices in the environment have not changed location, the device configuration may return to that depicted in FIG. 9A, or to a similar configuration.

In some embodiments of the invention, a group possesses its own maximum hierarchy depth and this maximum group depth can be applied to extend that of a default hierarchy (e.g., when the group's root sync station synchronizes with a non-group device that is a member of the default hierarchy). For example, with reference to FIG. 9B, suppose device 910d had a higher master preference value than device 910c (or suppose they switched places), and that both are within far range of group root synchronization station 910g but not within close range. Synchronization rules above would dictate that device 910g synchronize with device 910d, but this would normally be barred because of the maximum depth of the default hierarchy (i.e., three).

In these embodiments of the invention, however, a default maximum depth is extended by a maximum depth parameter of a group. Therefore if the maximum default hierarchy depth in FIG. 9B is three, and if the maximum group hierarchy depth is two, then the longest path from the default root synchronization station to a leaf device that traverses at least one member of the group, is five. In this illustrative scenario, device 910g could synchronize with device 910d, for example, and the maximum path distance would then be demonstrated between default root synchronization station 910a and leaf device 910m (i.e., 910a→910b→910d→910g→910h→910m).

Two or more groups having different group identifiers but operating the same application may merge. Similar to the synchronization process within a hierarchy, the members will synchronize under the best synchronization station that is a member of the combined groups, and adopt that station's group identifier, or possibly generate a new one for the merged group.

Figure 10A:
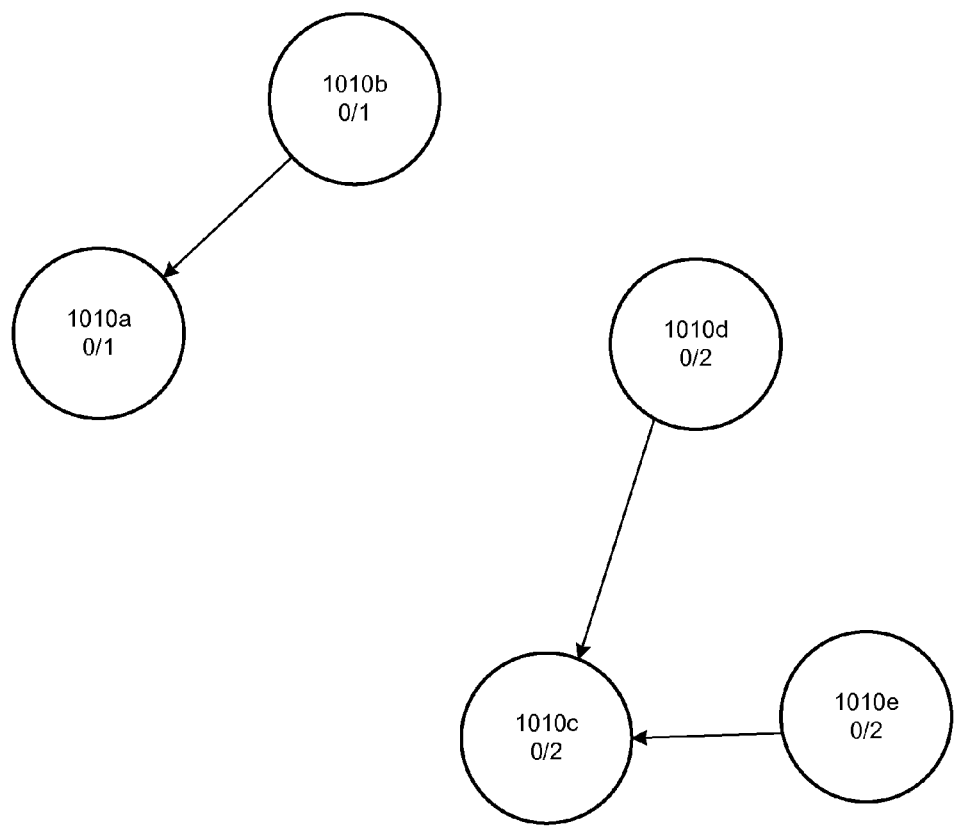
FIGS. 10A-C depict the merger of multiple groups according to some embodiments of the invention.
Figure 10A:
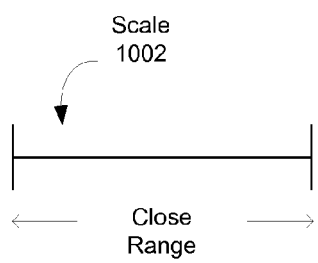
Figure 10B:
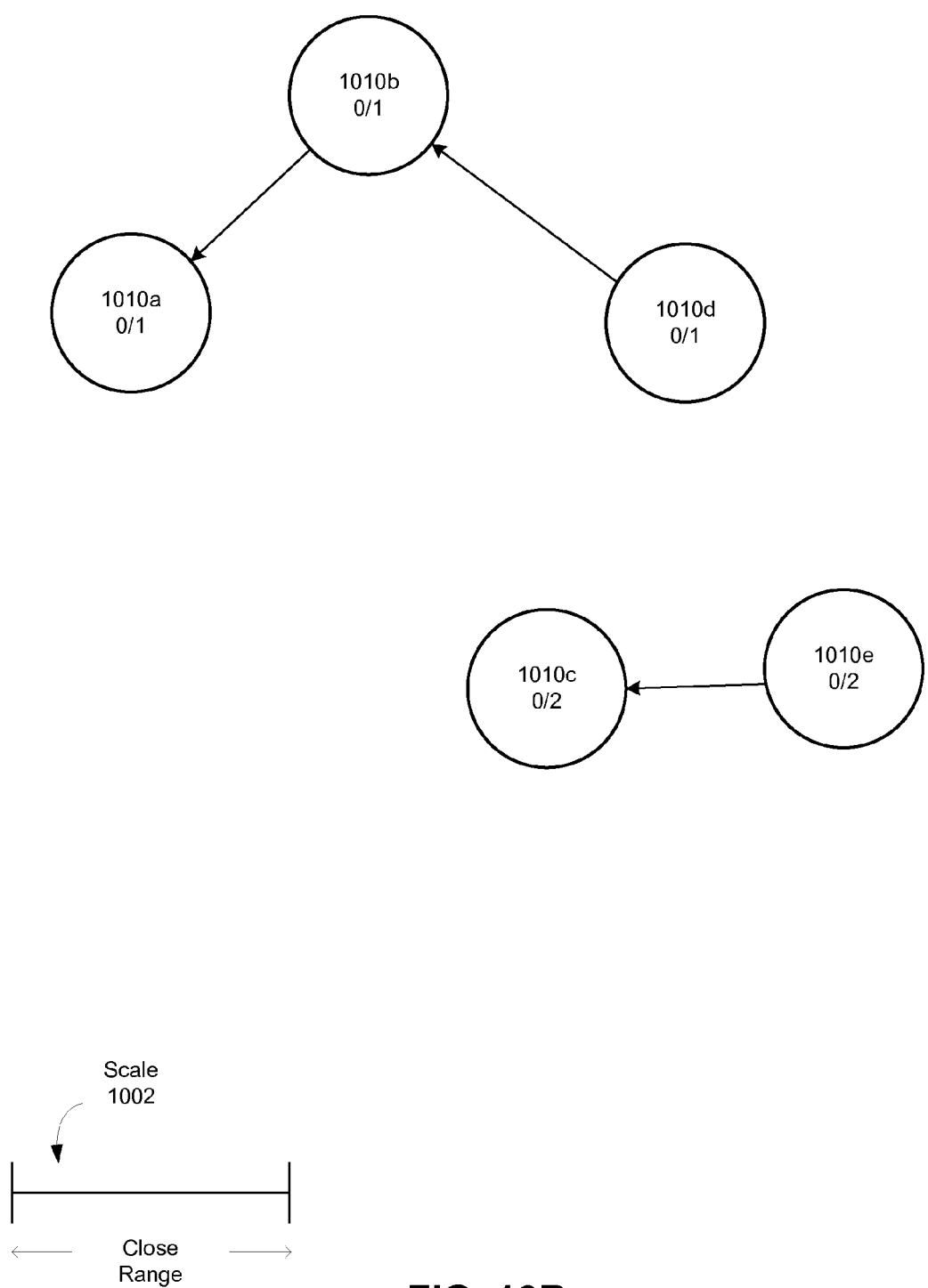
Figure 10C:
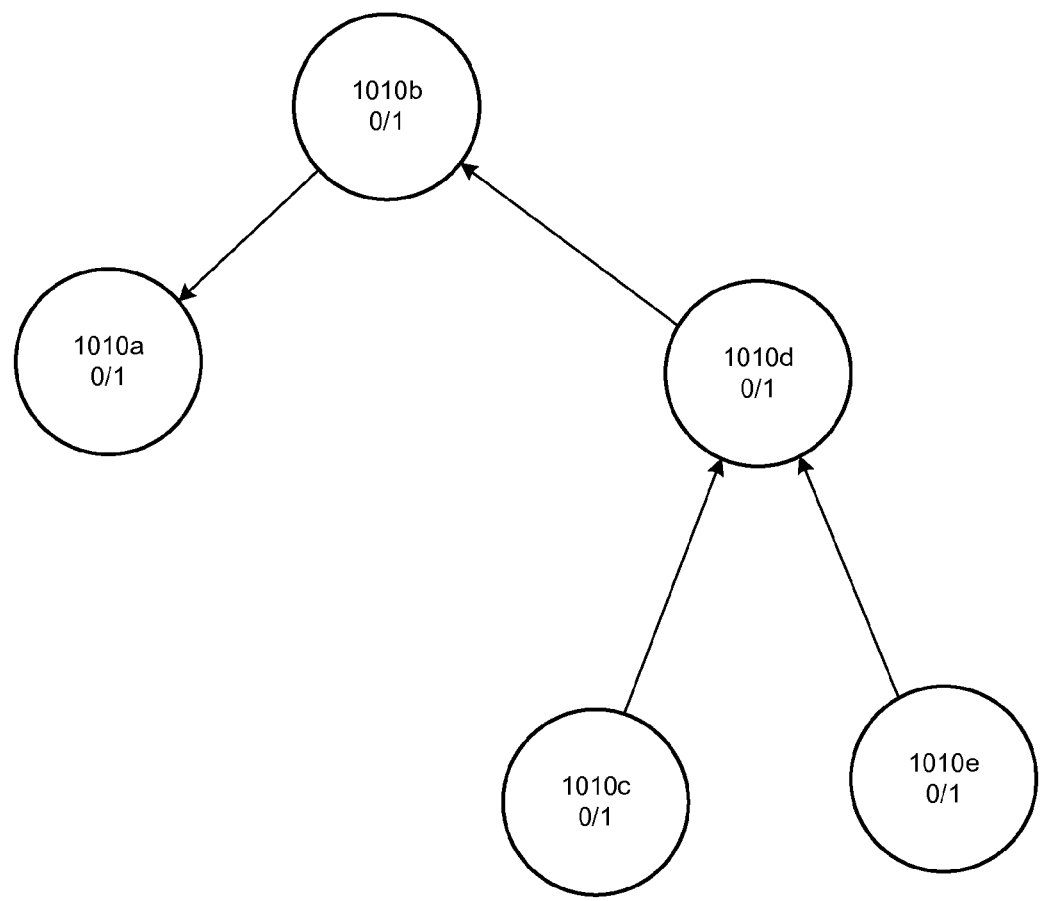
Figure 10C:
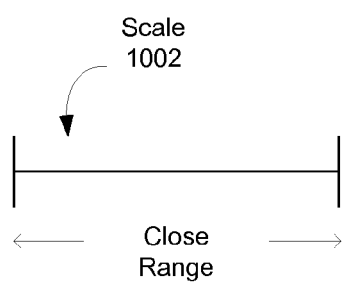

FIGS. 10A-C depict the merger of multiple private groups according to some embodiments of the invention. In these embodiments, the devices may be operating the same or compatible applications for sharing files, playing a game, using a shared resource, etc. For example, devices of one private group may move closer to another private group that is using the same application, and a lower-level protocol layer may inform a higher layer (e.g., the application) of the availability of other devices. The application may (or may not) add those devices to its group, depending on its configuration or constraints placed on the application.

In FIG. 10A, the devices are labeled in order according to their preference values, wherein device 1010a>device 1010b> . . . >device 1010e. Devices 1010a and 1010b form one private group, having group identifier 1, while devices 1010c, 1010d and 1010e form a second group having group identifier 2. Their group root sync stations (i.e., devices 1010a, 1010c) may be synchronized to the same hierarchy or different hierarchies, and even may be synchronized to the same device within a default hierarchy.

As the two groups of devices move closer together, or when a device in the group rooted at device 1010c detects the other group, which advertises a better group root sync station, the groups may begin to merge. The decision whether or not to merge multiple groups operating a common application, but having different group identifiers, is made by that application. If they are merged, one of them drops their group identifier and adopts the other's. In a scenario in which two different groups independently adopt the same group identifier, they may be automatically merged if and when they come into proximity FIG. 10B depicts the devices of FIG. 10A after device 1010d hears a synchronization frame of device 1010b. Because group root synchronization station 1010a has a higher preference value than device 1010c, device 1010d adopts the group identifier of that group and breaks synchronization with device 1010c.

The synchronization frame issued by device 1010b that led device 1010d to change groups may be a master indication frame (MIF) issued on a social channel. In an embodiment of the invention reflected in FIGS. 10A-C, devices are programmed to occasionally tune to a social channel, which allows them to hear devices other than those they are already synchronized with. In this case it allowed device 1010d to hear the MIF issued by device 1010b.

During most availability windows observed by a group or other set of synchronized devices, the devices will rendezvous on a channel not widely used (e.g., not a social channel). However, during some availability windows (e.g., those having sequence numbers 0, 15, 31 and 47 in a sequence of 64 availability windows), the rendezvous occur on social channels. Therefore, while device 1010d would normally not hear device 1010b because the two separate groups spend most of their time on different (non-social) channels, the periodic MIFs broadcast on one or more social channels allows devices to learn of devices outside their own cluster of synchronized devices.

FIG. 10C depicts the environment after devices 1010c, 1010e hear device 1010d advertising group 1 and the master preference value of device 1010a. They also abandon group 2 and synchronize with that group.

In an embodiment of the invention depicted in FIGS. 10A-C, the process of merging two separate groups using a common application may involve more interaction. In this embodiment, when the groups first come in range, such that a device in one of the groups can hear a device in the other group, the groups' devices will first synchronize within their common default hierarchy. This puts them both on the same schedule of availability windows, which allows them to easily discover each other and their services (e.g., they can now run the Bonjour protocol). For example, because they are now applying the same schedule of availability windows, they will periodically rendezvous on the same social channel (e.g., at least during availability window sequence number 0).

Via MIFs issued during these periodic social rendezvous, and/or Bonjour frames, device 1010d (and/or other devices) will detect its proximity to peer devices that are using the same application but with different group identifiers, and vice versa. On these devices, the common application (or some utility software or upper-layer of the communication protocol) will decide that one of the group identifiers must be dropped so that both groups' devices can work together.

Assuming group 2 is dropped, device 1010d will adopt group identifier 1 and apply a set of rules for synchronizing with a group, such as those delineated above. Rule 1 above would cause device 1010d to synchronize with device 1010b, because it is the best group device or synchronization station in close range.

Devices 1010c, 1010e will then learn of the other group (e.g., via a MIF during an availability window on a social channel, or via Bonjour), will trade group identifier 2 for group identifier 1 and will apply the applicable group synchronization rules. The set of synchronization rules such as those delineated above may indicate that device 1010e should synchronize with device 1010c (e.g., according to Rule 1). However, an operative set of rules for this scenario may give more weight and emphasis to synchronizing with devices at lower strata in a hierarchy (i.e., nearer the root). Thus, because device 1010d is at stratum 1 and is within close range, while device 1010c is at stratum 2, device 1010e will choose device 1010d as its master.

In some embodiments of the invention, configuration parameters and/or device behavior applied by a device may change when a private group is created, maintained or disbanded. For example, a maximum hierarchy depth parameter may be overridden to allow members of a group to synchronize with a hierarchy via their group root synchronization station, even if the parameter would otherwise block some or all group members from maintaining synchronization with a hierarchy.

As described above, an additional maximum "group" hierarchy depth may be added to the maximum depth of a default hierarchy when a group is formed. The maximum number of hops from the default root sync station of a device within the group, or of a device that is not a group member but that is synchronized with the default hierarchy through a group member, is equal to the sum of the two depth parameters.

As another example, a device that had been a leaf in a default hierarchy, and therefore did not broadcast synchronization frames, may do so if and when it becomes a member of a private group. This altered behavior may be only temporary, and may allow the group to include devices that otherwise would not learn of it. Further, and as already discussed, the process of selecting masters within a group may be different from, and may override, a "normal" master selection process that a device executes when it is not part of a private group.

A Peer Device

Figure 8:
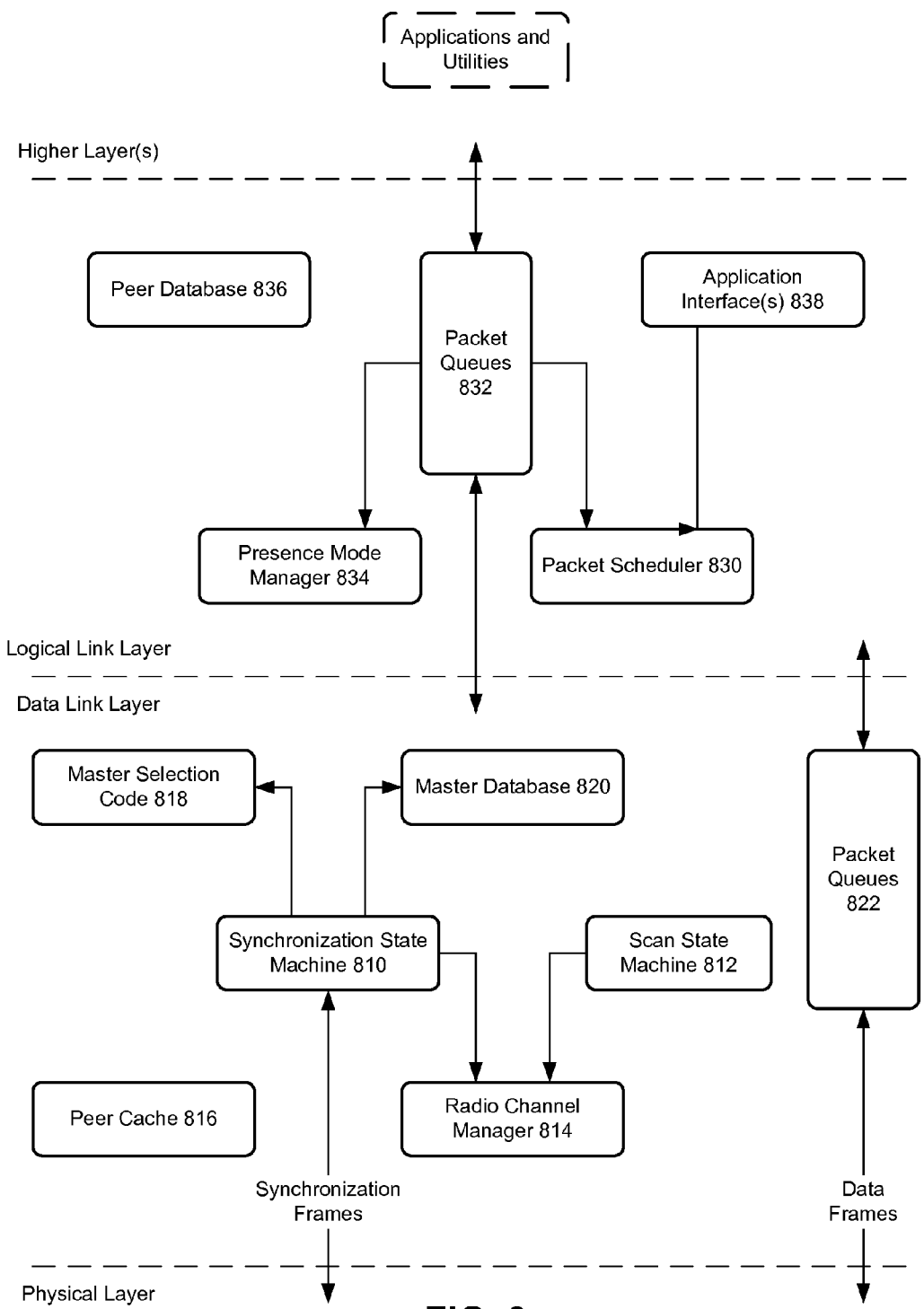
FIG. 8 is a block diagram of a peer device, according to some embodiments of the invention.

FIG. 8 is a block diagram of a peer communication device, according to some embodiments of the invention. Two primary protocol layers or operating layers are depicted in FIG. 8—the Logical Link Layer and the Data Link Layer. Above the logical link layer one or more applications and/or utilities (e.g., mDNS, Bonjour) may operate; below the data link Layer is the Physical Layer, responsible for transmitting frames over, and receiving frames from, the transmission medium.

In some embodiments of the invention, the Logical Link layer and Data Link layer may be physically implemented by separate processors or by integrated circuits residing on a single component. In the illustrative communication device of FIG. 8, some components of the device are omitted in the interest of clarity, such as processor, memory, display, antenna and communication port components, among others.

Within the data link layer, synchronization frames (e.g., periodic synchronization frames or PSFs, master indication frames or MIFs) are issued by and/or received by synchronization state machine 810. Incoming synchronization frames are routed to master database 820 and then passed upward to the logical link layer. Data frames are handled by packet queues 822.

Synchronization state machine 810 has two modes—leaf and master—and runs continuously in some implementations. As discussed earlier, a master device, also known as a synchronization station, is a device that issues periodic synchronization frames, while a leaf device does not, but is synchronized with a master.

The state machine is responsible for synchronization of the peer device to its current sync station (e.g., if the device is a leaf). If the device is a master, state machine 810 manages its transmission of periodic synchronization frames and/or master indication frames, and also manages its availability window presence.

Scan state machine 812 scans social channels for periodic synchronization frames. Radio channel manager 814 manages radio resources (e.g., a shared antenna) with other entities (e.g., an infrastructure module) and between different radios (e.g., Wi-Fi, Bluetooth). Synchronization state machine 810 interacts with radio channel manager 814 to switch the device's radio to the correct channel for an availability window, at the appropriate time. Scan state machine 812 and/or other components of the device may interact with the radio channel manager for other purposes (e.g., scanning a channel for new devices).

Peer cache 816 stores relevant information of a limited number of other devices with whom the host peer device is communicating or is about to communicate. Use of this cache may help alleviate problems associated with memory restrictions in some hardware/firmware implementations. For example, the Data Link Layer may be implemented by a dedicated Wi-Fi chipset, which typically does not have access to large memory banks Information in peer cache 816 is synchronized with information in peer database 836.

Master selection code 818 is periodically executed to perform a selection process for selecting or identifying synchronization stations, using information from peer database 836 and/or other information. For example, execution of the code may cause a ranking of devices in master database 820, based on their suitability to be a master.

Master database 820 stores data regarding all masters that the peer device is aware of. Such data may be used for synchronization and/or master selection, and may include, but is not limited to, RSSI (e.g., of latest frame, average of multiple frames, minimum, maximum), master preference values, selection metrics and synchronization parameters.

In some embodiments of the invention, master database 820 is populated or updated, and master selection code 818 executed, upon receipt of every periodic synchronization frame.

Packet queues 822 of the data link layer stores incoming and/or outgoing data frames. Packet queues 832 of the logical link layer store peer traffic incoming from, and outgoing to, other devices.

Packet scheduler 830 schedules multicast, broadcast and unicast traffic to synchronized devices, and out-of-band inquiries/responses to masters with which the peer is not synchronized ("non-synchronized masters") and to devices synchronized with non-synchronized masters. The peer database stores information regarding the non-synchronized masters' availability windows, presence modes and other timing-related information.

Presence mode manager 834 controls the peer device's presence mode, based on factors that may include, but that are not limited to: current active data links to synchronized devices, current data rates to those devices, scan requirements, out-of-band inquiry requirements, power management state, Bluetooth requirements, other radio requirements, etc.

Peer database 836 identifies all devices known to the peer device illustrated in FIG. 8, and stores information regarding each device. This information may include, but is not limited to, its root master, other masters, master selection metrics, capabilities (e.g., supported frequency bands, channel bandwidths, modulation/data rates), presence mode, services supported by the device, outstanding block ACK agreements, and so on. Peer database 836 may thus assist in a master selection process by providing a list of candidate devices that can be ordered by preference value.

Application interfaces 838 include interfaces to higher system layers and modules, which may include but are not limited to: configuration and network management, a GUI (Graphical User Interface), service advertisement and discovery, and so on. The GUI may present a device user with a list of surrounding peers, their physical proximities, range or signal strengths, lists of their service, and/or other information.

The configuration of the peer device presented in FIG. 8 is exemplary. In other embodiments of the invention a peer device's configuration may differ to varying degrees. For example, functions of the components of the peer device of FIG. 8 may be combined in a different manner, those of a single component may be subdivided, and/or those of multiple components may be merged.

In some embodiments, a peer device includes an application processor to support applications (e.g., the applications and utilities residing in higher layers in FIG. 8). The application processor provides memory management, graphics processing and/or other functions needed by the applications. The peer device in these embodiments also includes a baseband processor for performing wireless communications, and corresponding memory and transceiver for supporting the communications and communications processing.

The baseband processor may include all of the components depicted in the logical link layer and data link layers and the functionality described in conjunction with those components. The baseband processor may also handle some tasks normally associated with the physical layer (e.g., channel coding).

Thus, in some embodiments of the invention, a "communication module" or "wireless communication module" of a peer device may refer to a robust baseband processor described immediately above. In some other embodiments, a communication module may encompass a baseband processor and a corresponding transceiver for operating or managing an antenna of the device, and possibly memory used by the baseband processor. In yet other embodiments, a communication module may encompass the components of the logical link layer and data link layer of FIG. 8, and other components necessary to transmit and receive data to and from the peer device.

Some embodiments of the invention promote coexistence of a peer-to-peer communication protocol, as described herein, with other applications that require the radio or other communication resources of a peer device. For example, the device may operate an application or another protocol, such as Bluetooth®.

In these embodiments, Bluetooth communications can be performed as desired, except during the device's availability window and any extensions thereto. Outside of the availability window, Bluetooth scans, inquiries and/or other operations are allowed, and may even take priority over data frames adhering according to a protocol provided here.

A master's periodic synchronization frame may be delayed because of a Bluetooth (or other application/protocol) operation using the device's antenna, but normally will not be dropped. Bluetooth or other operations may not be permitted during out-of-band inquiries and responses.

Synchronization and operation of peer devices as provided herein can also coexist with an application or protocol that relies on some communication infrastructure (e.g., an access point) not part of the peer device hierarchy.

The environment in which some embodiments of the invention are executed may incorporate a general-purpose computer or a special-purpose device such as a hand-held computer, smart phone or other mobile device. Details of such devices (e.g., processor, memory, data storage, display) may be omitted for the sake of clarity.

The data structures and code described in this detailed description are typically stored on a computer-readable storage medium, which may be any device or medium that can store code and/or data for use by a computer system. The computer-readable storage medium includes, but is not limited to, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules may include, but are not limited to, application-specific integrated circuit (ASIC) chips, field-programmable gate arrays (FPGAs) and other programmable-logic devices now known or later developed. When the hardware modules are activated, the hardware modules perform the methods and processes included within the hardware modules.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A peer device for participating in a peer-to-peer network comprising:
    a memory configured to store a preference value, wherein the preference value is used to select a sync station; and
    a processor coupled to the memory, wherein the processor is configured to:
        receive one or more branch sync preference values, one or more root sync preference values, and a default identifier that identifies a default hierarchy that includes default hierarchy peer device members including the peer device;
        set a group identifier that identifies a group hierarchy that includes group hierarchy peer device members that include a subset of the default hierarchy including the peer device;
        based at least on the preference value, the one or more branch sync preference values, the one or more root sync preference values, the group identifier, and the default identifier, synchronize with the default hierarchy while participating in the group hierarchy; and
        broadcast the preference value, a root sync preference value of the one or more root sync preference values, the default identifier, and the group identifier, wherein a root sync station in the default hierarchy associated with the root sync station preference value is not a member of the group hierarchy.

2. The device of claim 1, wherein group hierarchy peer device members execute a common application.

3. A method of organizing peer communication devices in a peer-to-peer network, the method comprising, at a first peer communication device:
    receiving one or more branch sync preference values, one or more root sync preference values, and a default identifier that identifies a default hierarchy including default hierarchy peer communication device members including the first peer communication device;
    setting a group identifier that identifies a group hierarchy that includes group hierarchy peer communication device members that include a subset of the default hierarchy including the first peer communication device;
    synchronizing with the default hierarchy while participating in the group hierarchy, based at least on a preference value of the first peer communication device, the one or more branch sync preference values, the one or more root sync preference values, the group identifier, and the default identifier; and
    broadcasting the preference value of the first peer communication device, a root sync preference value of the one or more root sync preference values, the default identifier, and the group identifier, wherein a root sync station in the default hierarchy associated with the root sync preference value is not a member of the group hierarchy.

4. The method of claim 3, wherein the group hierarchy executes a common application.

5. The method of claim 3, further comprising:
publishing a schedule of availability windows for the group hierarchy, wherein the schedule is configured to avoid a congested communication channel and use a band common to the group hierarchy, and wherein a parameter of an availability window of the availability windows is adjusted to avoid interfering with a common application or service shared by the group hierarchy.

6. The method of claim 5, further comprising:
detecting a second hierarchy that includes second hierarchy peer communication device members; and
merging the group hierarchy and the second hierarchy.

7. The method of claim 6, wherein the merging the group hierarchy and the second hierarchy comprises:
identifying a superior group root sync station between the first peer communication device and a second hierarchy group root sync station wherein the superior group root sync station has a higher preference value; and
synchronizing the group hierarchy and the second hierarchy under the superior group root sync station.

8. The method of claim 7, further comprising:
configuring group identifiers of the group hierarchy or the second hierarchy peer communication device members under the superior group root sync station to a common value.

9. A non-transitory computer-readable medium having instructions stored therein, which when executed by a processor in a first peer communication device, cause the processor to perform operations for organizing peer communication devices in a peer-to-peer network, the operations comprising:
receiving one or more branch sync preference values, one or more root sync preference values, and a default identifier that identifies a default hierarchy that includes default hierarchy peer communication device members including the first peer communication device;
setting a group identifier that identifies a group hierarchy that includes group hierarchy peer communication device members that include a subset of the default hierarchy including the first peer communication device;
based at least on a preference value of the first peer communication device, the one or more branch sync preference values, the one or more root sync preference values, the group identifier, and the default identifier, synchronizing with the default hierarchy while participating in the group hierarchy; and
broadcasting the preference value of the first peer communication device, a root sync preference value of the one or more root sync preference values, the default identifier and the group identifier,
wherein a root sync station in the default hierarchy associated with the root sync preference value is not a member of the group hierarchy.

10. A method of synchronizing peer devices in a peer-to-peer communication environment at a first peer device, the method comprising:
receiving one or more branch sync preference values, one or more root sync preference values, a default identifier that identifies a default hierarchy that includes default hierarchy peer device members including the first peer device, a group identifier that identifies a group hierarchy that includes group hierarchy peer device members that include a subset of the default hierarchy including the first peer device; and
based on at least the one or more branch sync preference values, the one or more root sync preference values, the default identifier, the group identifier, and a preference value of the first peer device, synchronizing with the default hierarchy while participating in the group hierarchy, comprising:
determining a default root sync station of the default hierarchy, based at least on the one or more root sync preference values, wherein the default root sync station is not a member of the group hierarchy; and
broadcasting the default identifier and first communications identifying a first availability window during which members of the default hierarchy synchronize; and
broadcasting the group identifier and
second communications identifying a second availability window during which members of the group hierarchy synchronize.

11. A group root sync station of a group hierarchy of peer communication devices, comprising:
a processor configured to:
receive one or more branch sync preference values, one or more root sync preference values, a default identifier that identifies a default hierarchy that includes default hierarchy peer communication device members including the group root sync station, a second identifier that identifies a second hierarchy that includes second hierarchy peer communication device members, and a group identifier that identifies a group hierarchy that includes group hierarchy peer communication device members including: a subset of the default hierarchy including the group root sync station; and a second hierarchy peer communication device member;
based on at least the one or more branch sync preference values, the one or more root sync preference values, the default identifier, the second identifier, the group identifier, and a preference value of the group root sync station, synchronize with the default hierarchy while participating in the group hierarchy; and
broadcast the group identifier,
the preference value of the group root sync station, wherein the preference value of the group root sync station is higher than preference values among the group hierarchy peer communication device members, and
a highest root sync preference value among the one or more root sync preference values, wherein a root sync station in the default hierarchy corresponding with the highest root sync preference value is not a member of the group hierarchy.

12. The group root sync station of claim 11, wherein the processor is further configured to:
transmit a synchronization frame including the default identifier.

13. The method of claim 10, wherein the receiving the group identifier comprises:
receiving the group identifier from a given group hierarchy peer communication device member, wherein the group identifier is generated by the given group hierarchy peer communication device member.

14. The method of claim 7, wherein the identifying the superior group root sync station comprises:
tuning to a social channel that is different than a channel on which the first peer communication device is synchronized;
receiving a second preference value of the second hierarchy group root sync station; and
determining that the second preference value of the second hierarchy group root sync station is higher than the preference value of the first peer communication device.

15. The method of claim 6, further comprising:
determining after the merging, a change in a configuration parameter or behavior of the first peer communication device, wherein the configuration parameter is a maximum hierarchy depth.

16. The peer device of claim 1, wherein the group hierarchy comprises a second device of a second default hierarchy, wherein the second default hierarchy is different than the default hierarchy.

17. The group root sync station of claim 11, wherein to receive the group identifier, the processor is configured to:
synchronize with the default hierarchy by tuning a radio to a channel at a time within a duration, wherein the channel, the time, and the duration are specified in a periodic synchronization frame broadcast by a sync station of the default hierarchy; and
receive a private group identifier comprising the group identifier via the periodic synchronization frame, or via a master indication frame in the duration.

18. The group root sync station of claim 17, wherein the processor is further configured to:
determine a purpose of the group hierarchy in a same communication as the private group identifier, or via a discovery protocol; and
accept the group identifier.

19. The method of claim 10, wherein the receiving the group identifier comprises:
synchronizing with the default hierarchy by tuning a radio to a channel at a time within a duration, wherein the channel, the time, and the duration are specified in a periodic synchronization frame broadcast by a sync station of the default hierarchy; and
receiving a private group identifier comprising the group identifier via the periodic synchronization frame, or via a master indication frame in the duration.

20. The method of claim 19, further comprising:
determining a purpose of the group hierarchy in a same communication as the private group identifier, or via a discovery protocol; and
accepting the group identifier.

21. The group root sync station of claim 11, wherein to receive the group identifier, the processor is configured to:
receive the group identifier from a given group hierarchy peer communication device member, wherein the group identifier is generated by the given group hierarchy peer communication device member.

* * * * *